(12) United States Patent
Okada et al.

(10) Patent No.: US 11,516,533 B2
(45) Date of Patent: Nov. 29, 2022

(54) RECEIVING APPARATUS, COMMUNICATION SYSTEM, AND RECEIVING APPARATUS CONTROL METHOD

(71) Applicant: SONY SEMICONDUCTOR SOLUTIONS CORPORATION, Kanagawa (JP)

(72) Inventors: Satoshi Okada, Kanagawa (JP); Ryosuke Suda, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 17/250,469

(22) PCT Filed: May 15, 2019

(86) PCT No.: PCT/JP2019/019230
§ 371 (c)(1),
(2) Date: Jan. 25, 2021

(87) PCT Pub. No.: WO2020/026558
PCT Pub. Date: Feb. 6, 2020

(65) Prior Publication Data
US 2021/0168429 A1   Jun. 3, 2021

(30) Foreign Application Priority Data

Aug. 2, 2018   (JP) .............................. JP2018-146027

(51) Int. Cl.
*H04N 21/426* (2011.01)
*H04N 21/438* (2011.01)

(52) U.S. Cl.
CPC ... *H04N 21/42607* (2013.01); *H04N 21/4382* (2013.01)

(58) Field of Classification Search
None
See application file for complete search history.

(56) References Cited

U.S. PATENT DOCUMENTS

2017/0366381 A1   12/2017   Zoellner et al.

FOREIGN PATENT DOCUMENTS

| CA | 2970121 A1 | 6/2016 |
|---|---|---|
| JP | 2018-503298 A | 2/2018 |

(Continued)

OTHER PUBLICATIONS

International Search Report and Written Opinion of PCT Application No. PCT/JP2019/019230 dated Jul. 2, 2019, 07 pages of ISRWO.

(Continued)

*Primary Examiner* — Omar S Parra
(74) *Attorney, Agent, or Firm* — Chip Law Group

(57) ABSTRACT

Channel bonding is realized in a receiving apparatus that receives terrestrial digital broadcasting compliant with an ATSC 3.0 standard. A first receiving circuit receives a first frame obtained by encoding first packets within a stream containing the first packets and second packets via a first frequency channel. A second receiving circuit receives a second frame obtained by encoding the second packets via a second frequency channel different from the first frequency channel. A first integrated circuit decodes the first frame and acquires the first packets. The second integrated circuit performs processing for decoding the second frame and acquiring the second packets and processing for bonding the first packets and the second packets together and reconstructing the stream.

10 Claims, 20 Drawing Sheets

(56) References Cited

FOREIGN PATENT DOCUMENTS

JP       2018503298 A  *  2/2018
WO    2016/091905 A1    6/2016

OTHER PUBLICATIONS

"ATSC Standard: Physical Layer Protocol Doc (A/322)", Doc. A/322:2017 , Feb. 9, 2017, Advanced Television Systems Committee, 262 pages.

* cited by examiner

FIG. 5

| L1-Detail INFORMATION | | 600 |
|---|---|---|
| Syntax | No. of Bits | |
| L1_Detail_signaling() { | | |
|     L1D_version | 4 | |
|     L1D_num_rf | 3 | |
|     for (L1D_rf_id=1 .. L1D_num_rf) { | | |
|         L1D_bonded_bsid | 16 | |
|         Reserved | 3 | |
| ⋯ | | |
|     for (j=0 .. L1D_num_plp) { | | |
|         L1D_plp_id   —601 | 6 | |
|         L1D_plp_lls_flag | 1 | |
|         L1D_plp_layer | 2 | |
|         L1D_plp_start   —602 | 24 | |
|         L1D_plp_size | 24 | |
|         L1D_scrambler_type | 2 | |
|         L1D_plp_fec_type   —603 | 4 | |
|         if(L1D_plp_fec_type ∈ {0,1,2,3,4,5}){ | | |
|             L1D_plp_mod | 4 | |
|             L1D_plp_cod   —604 | 4 | |
|         } | | |
|         L1D_plp_TI_mode | 2 | |
|         if (L1D_plp_TI_mode=00) { | | |
|             L1D_plp_fec_block_start | 15 | |
|         } else if (L1D_plp_TI_mode=01) { | | |
|             L1D_plp_CTI_fec_block_start | 22 | |
|         } | | |
|         if (L1D_num_rf>0) { | | |
|             L1D_plp_num_channel_bonded   —605 | 3 | |
|             if (L1D_plp_num_channel_bonded>0) { | | |
|                 L1D_plp_channel_bonding_format   —606 | 3 | |
|                 for (k=0..L1D_plp_num_channel_bonded){ | | |
|                       L1D_plp_bonded_rf_id | 3 | |
|                 } | | |
|             } | | |
|         } | | |
|     } | | |

FIG.15

| | SUB -> MAIN DATA | | | | EXPLANATION |
|---|---|---|---|---|---|
| | CLK | DATA | SYNC | VALID | |
| PATTERN 1 | PRESENT | PRESENT | PRESENT | PRESENT | FIRST EMBODIMENT |
| PATTERN 2 | PRESENT | PRESENT | NOT PRESENT | PRESENT | MODIFICATION IN WHICH SYNCHRONIZING SIGNAL IS ADDED TO TOP OF DATA |
| PATTERN 3 | PRESENT | PRESENT | NOT PRESENT | NOT PRESENT | SYNCHRONIZING SIGNAL IS ADDED TO TOP OF DATA, AND DATA IS CONTINUOUSLY TRANSMITTED WITHOUT GAP |
| PATTERN 4 | PRESENT | PRESENT | PRESENT | NOT PRESENT | DATA IS CONTINUOUSLY TRANSMITTED WITHOUT GAP |

FIG.21

| | MAIN -> SUB DATA | | | | SUB -> MAIN DATA | | | |
|---|---|---|---|---|---|---|---|---|
| | CLK | DATA | SYNC | VALID | CLK | DATA | SYNC | VALID |
| PATTERN 1 | PRESENT | PRESENT | PRESENT | PRESENT | PRESENT | PRESENT | PRESENT | PRESENT |
| PATTERN 2 | PRESENT | PRESENT | NOT PRESENT | PRESENT | PRESENT | PRESENT | NOT PRESENT | PRESENT |
| PATTERN 3 | PRESENT | PRESENT | NOT PRESENT | NOT PRESENT | PRESENT | PRESENT | NOT PRESENT | NOT PRESENT |
| PATTERN 4 | PRESENT | PRESENT | PRESENT | NOT PRESENT | PRESENT | PRESENT | PRESENT | NOT PRESENT |
| PATTERN 5 | PRESENT | PRESENT | PRESENT | PRESENT | NOT PRESENT | PRESENT | PRESENT | PRESENT |
| PATTERN 6 | PRESENT | PRESENT | NOT PRESENT | PRESENT | NOT PRESENT | PRESENT | NOT PRESENT | PRESENT |
| PATTERN 7 | PRESENT | PRESENT | NOT PRESENT | NOT PRESENT | NOT PRESENT | PRESENT | NOT PRESENT | NOT PRESENT |
| PATTERN 8 | PRESENT | PRESENT | PRESENT | NOT PRESENT | NOT PRESENT | PRESENT | PRESENT | NOT PRESENT |
| PATTERN 9 | NOT PRESENT | PRESENT | PRESENT | PRESENT | PRESENT | PRESENT | PRESENT | PRESENT |
| PATTERN 10 | NOT PRESENT | PRESENT | NOT PRESENT | PRESENT | PRESENT | PRESENT | NOT PRESENT | PRESENT |
| PATTERN 11 | NOT PRESENT | PRESENT | NOT PRESENT | NOT PRESENT | PRESENT | PRESENT | NOT PRESENT | NOT PRESENT |
| PATTERN 12 | NOT PRESENT | PRESENT | PRESENT | NOT PRESENT | PRESENT | PRESENT | PRESENT | NOT PRESENT |

RECEIVING APPARATUS, COMMUNICATION SYSTEM, AND RECEIVING APPARATUS CONTROL METHOD

CROSS REFERENCE TO RELATED APPLICATIONS

This application is a U.S. National Phase of International Patent Application No. PCT/JP2019/019230 filed on May 15, 2019, which claims priority benefit of Japanese Patent Application No. JP 2018-146027 filed in the Japan Patent Office on Aug. 2, 2018. Each of the above-referenced applications is hereby incorporated herein by reference in its entirety.

TECHNICAL FIELD

The present technology relates to a receiving apparatus, a communication system, and a receiving apparatus control method. Specifically, the present technology relates to a receiving apparatus that receives terrestrial digital broadcasting, a communication system receiving terrestrial digital broadcasting, and a receiving apparatus control method.

BACKGROUND ART

Development and research of a receiving apparatus for receiving next-generation terrestrial digital broadcasting using an ATSC (Advanced Television Systems Committee standards) 3.0 standard have recently been underway. In this ATSC 3.0 standard, use of a technology called channel bonding is planned for improvement of frequency band utilization efficiency (refer to, for example, NPL 1). The channel bonding means herein that, when a transmitting apparatus partitions one stream into a plurality of pieces of data and transmits the plurality of pieces of data via frequency channels different from each other, a receiving apparatus receives those pieces of data and bonds the data together.

CITATION LIST

Non Patent Literature

[NPL 1]
"ATSC Standard: Physical Layer Protocol Doc. A/322: 2017," Advanced Television Systems Committee, Internet (https://www.atsc.org/standards/atsc3-0-standards/)

SUMMARY

Technical Problem

The conventional technology described above is capable of improving the frequency band utilization efficiency with use of the channel bonding. NPL 1, however, does not describe receiving-side specifications while describing transmitting-side specifications. For this reason, development of a channel bonding-enabled receiving apparatus is required.

The present technology has been achieved in light of such circumstances, and an object of the present technology is to realize channel bonding in a receiving apparatus that receives terrestrial digital broadcasting compliant with the ATSC 3.0 standard.

Solution to Problem

The present technology has been made to solve the problem described above, and a first aspect of the present technology provides a receiving apparatus including a first receiving circuit that receives a first frame obtained by encoding first packets within a stream containing the first packets and second packets via a first frequency channel, a second receiving circuit that receives a second frame obtained by encoding the second packets via a second frequency channel different from the first frequency channel, a first integrated circuit that decodes the first frame and that acquires the first packets, and a second integrated circuit that performs processing for decoding the second frame and acquiring the second packets and processing for bonding the first packets and the second packets together and reconstructing the stream, and a control method for the receiving apparatus. This can produce an effect of reconstructing the stream from the first and second packets acquired via the first and second frequency channels.

Moreover, according to this first aspect, the first integrated circuit includes a first demodulation section that demodulates the first frame and that acquires a plurality of first input cells, a first cell exchange section that exchanges part of the plurality of first input cells with cells of the second integrated circuit and that outputs the exchanged cells as first output cells, and a first decoding section that decodes the first output cells and that acquires the first packets, and the second integrated circuit includes a second demodulation section that demodulates the second frame and that acquires a plurality of second input cells, a second cell exchange section that exchanges part of the plurality of second input cells with the cells of the first integrated circuit and that outputs the exchanged cells as second output cells, a second decoding section that decodes the second output cells and that acquires the second packets, and a bonding section that bonds the first packets and the second packets together and that reconstructs the stream. This can produce an effect of cell exchange.

Moreover, according to this first aspect, the first cell exchange section may acquire a numerical value according to an input index of each of the first input cells and may exchange the first input cell in a case in which the input index is odd-numbered, and the second cell exchange section may acquire an input index of each of the second input cells and may exchange the second input cell in a case in which the input index is odd-numbered. This can produce an effect of exchange of only the odd-numbered cells.

Moreover, according to this first aspect, the first cell exchange section may transmit at least one of a clock signal, a numerical value according to the input index, a synchronizing signal, or a data valid signal together with the first input cells to the second cell exchange section. This can produce an effect of ensuring transmission of the first input cells.

Moreover, according to this first aspect, the second cell exchange may transmit at least one of a clock signal, a numerical value according to the input index, a synchronizing signal, or a data valid signal together with the second input cells to the first cell exchange. This can produce an effect of ensuring transmission of the second input cells.

Moreover, according to this first aspect, the second integrated circuit may bond the first packets and the second packets together in a case in which predetermined conditions are satisfied. This can produce an effect of bonding together only the packets that satisfy the condition.

Moreover, according to this first aspect, the first frame may contain a first coded block obtained by encoding the first packets, the second frame may contain a second coded block obtained by encoding the second packets, the first integrated circuit may determine whether or not an error is present in the first packets whenever the first coded block is decoded and may generate a first decoding lock flag in a case in which the number of times of continuous determination that the error is not present exceeds a predetermined number of times, and the second integrated circuit may determine whether or not an error is present in the second packets whenever the first coded block is decoded, may generate a second decoding lock flag in a case in which the number of times of continuous determination that the error is not present exceeds a predetermined number of times, and may start to bond the first packets and the second packets together upon generation of the first decoding lock flag and the second decoding lock flag. This can produce an effect of bonding the packets together in a case in which a transmission state is favorable.

Moreover, according to this first aspect, the second integrated circuit may bond the first packets for which it is determined that the error is not present and the second packets for which it is determined that the error is not present, together. This can produce an effect of bonding the packets without errors.

Moreover, according to this first aspect, the first integrated circuit may transmit at least one of a clock signal, a synchronizing signal, or a data valid signal together with the first packets to the second integrated circuit. This can produce an effect of ensuring transmission of the packets.

Moreover, according to this first aspect, the first and second frames may be frames compliant with an ATSC (Advanced Television Systems Committee standards) 3.0 standard. This can produce an effect of receiving terrestrial digital broadcasting compliant with the ATSC 3.0 standard.

Moreover, a second aspect of the present technology provides a communication system including a transmitting apparatus that transmits a first frame obtained by encoding first packets within a stream containing the first packets and second packets via a first frequency channel and that transmits a second frame obtained by encoding the second packets via a second frequency channel different from the first frequency channel, a first receiving circuit that receives the first frame via the first frequency channel, a second receiving circuit that receives the second frame via the second frequency channel, a first integrated circuit that decodes the first frame and that acquires the first packets, and a second integrated circuit that performs processing for decoding the second frame and acquiring the second packets, and processing for bonding the first packets and the second packets together and reconstructing the stream. This can produce an effect of acquiring the first and second packets from the first and second frames transmitted via the first and second frequency channels and reconstructing the stream from those packets.

Advantageous Effect of Invention

According to the present technology, it is possible to exhibit an excellent advantage that the receiving apparatus that receives terrestrial digital broadcasting compliant with the ATSC 3.0 standard is capable of realizing channel bonding. It is noted that advantages are not always limited to the advantage described herein and may be any of advantages described in the present disclosure.

BRIEF DESCRIPTION OF DRAWINGS

FIG. 5 is a diagram depicting an example of a syntax of L1-Detail information according to the first embodiment of the present technology.

FIG. 15 is a diagram depicting an example of data transfer patterns according to the first embodiment of the present technology and the modification of the first embodiment of the present technology.

FIG. 21 is a diagram depicting an example of data transfer patterns according to the embodiment of the present technology.

DESCRIPTION OF EMBODIMENTS

Modes for carrying out the present technology (hereinafter, referred to as "embodiments") will be described hereinafter. Description will be given in the following order.

1. First Embodiment (example in which a receiving apparatus performs channel bonding)
2. Second Embodiment (example in which a receiving apparatus performs cell exchange and channel bonding)
3. Third Embodiment (example in which a receiving apparatus performs channel bonding among three or more frequency channels)

1. First Embodiment

[Example of Configuration of Communication System]

Figure 1:
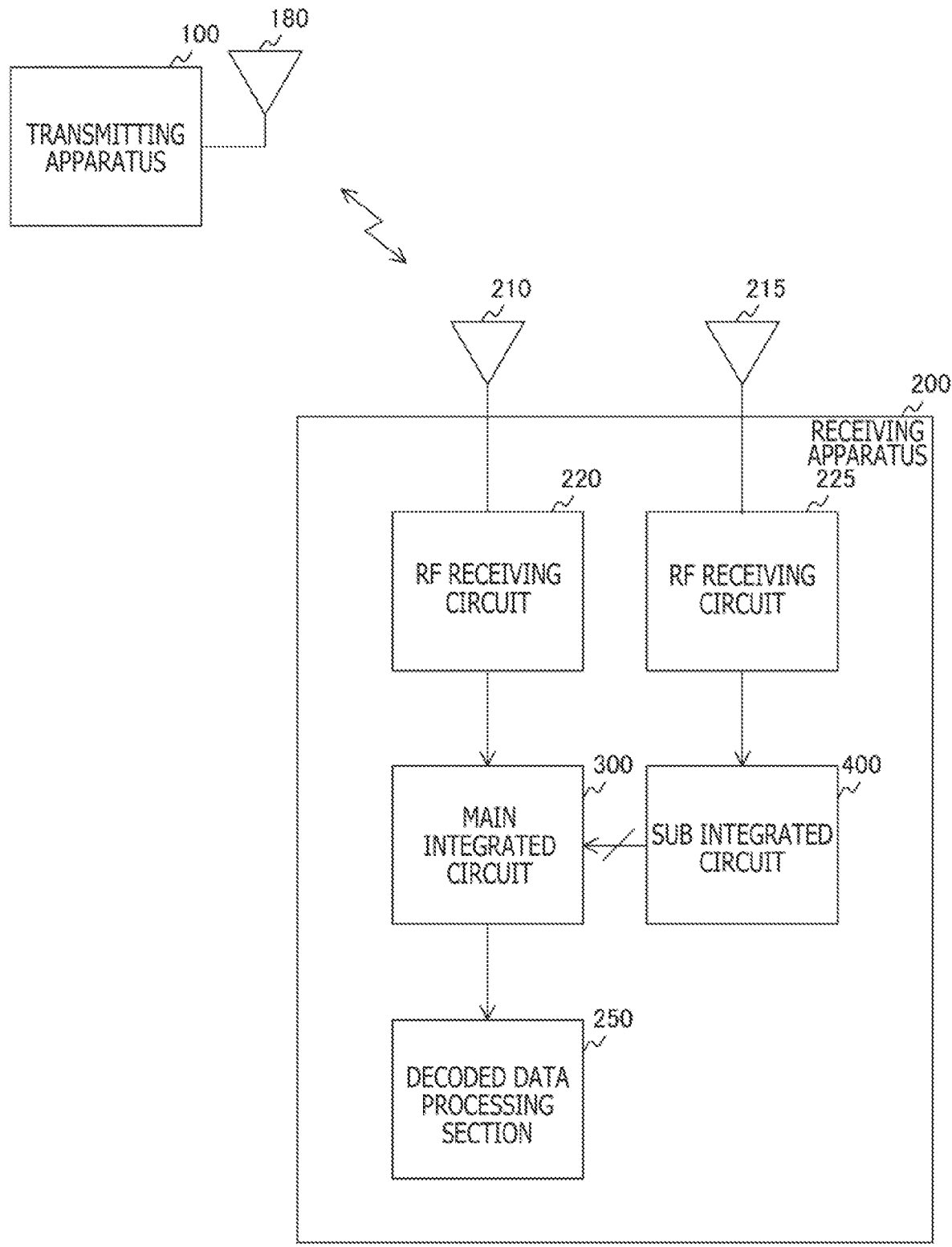
FIG. 1 is a block diagram depicting an example of a configuration of a communication system according to a first embodiment of the present technology.

FIG. 1 is a block diagram depicting an example of a configuration of a communication system according to a first embodiment of the present technology. This communication system is a system that transmits and receives terrestrial digital broadcasting compliant with the ATSC 3.0 standard and includes a transmitting apparatus 100 and a receiving apparatus 200.

The transmitting apparatus 100 includes an antenna 180. This transmitting apparatus 100 transmits data in OFDM frame units via a plurality of frequency channels. The antenna 180 transmits an OFDM-modulated RF signal.

The receiving apparatus 200 includes antennas 210 and 215, RF receiving circuits 220 and 225, a main integrated circuit 300, a sub integrated circuit 400, and a decoded data processing section 250.

The antennas 210 and 215 receive the RF signal via frequency channels different from each other. The antenna 210 supplies the RF signal to the RF receiving circuit 220, while the antenna 215 supplies the RF signal to the RF receiving circuit 225.

The RF receiving circuits 220 and 225 each perform AD (Analog to Digital) conversion and frequency conversion on the analog RF signal to acquire a baseband signal. The baseband signal is thereby received. The RF receiving circuit 220 supplies the baseband signal to the main integrated circuit 300 in OFDM frame units. The RF receiving circuit 225 supplies the baseband signal to the sub integrated circuit 400 in OFDM frame units. It is noted that the RF receiving circuit 220 is an example of a second receiving circuit set forth in claims. The RF receiving circuit 225 is an example of a first receiving circuit set forth in the claims.

The sub integrated circuit 400 acquires baseband packets (BBPs) by decoding an OFDM frame and outputs the BBPs to the main integrated circuit 300. It is noted that the sub integrated circuit 400 is an example of a first integrated circuit set forth in the claims.

The main integrated circuit 300 acquires BBPs by decoding an OFDM frame and bonds the BBPs and the BBPs from the sub integrated circuit 400 together. This main integrated circuit 300 supplies bonded data to the decoded data processing section 250 as decoded data. It is noted that the main integrated circuit 300 is an example of a second integrated circuit set forth in the claims.

The decoded data processing section 250 generates video and a sound by performing decoding processing and the like on the decoded data, and outputs the video and the sound to a display device and a speaker.

[Example of Configuration of Transmitting Apparatus]

Figure 2:
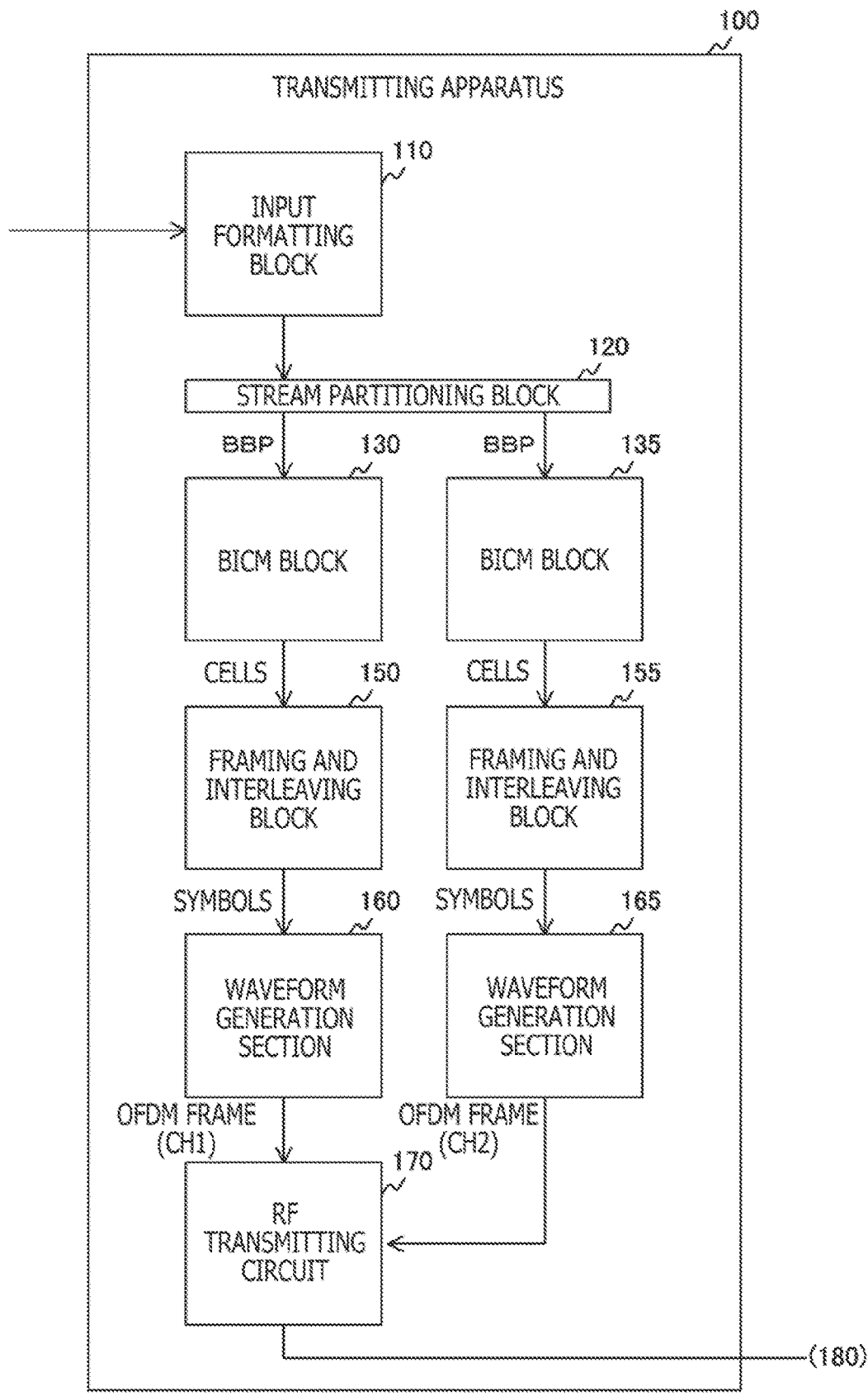
FIG. 2 is a block diagram depicting an example of a configuration of a transmitting apparatus according to the first embodiment of the present technology.

FIG. 2 is a block diagram depicting an example of a configuration of the transmitting apparatus 100 according to the first embodiment of the present technology. This transmitting apparatus 100 includes an input formatting block 110, a stream partitioning block 120, and BICM (Bit Interleaved and Coded Modulation) blocks 130 and 135. In addition, the transmitting apparatus 100 includes framing and interleaving blocks 150 and 155, waveform generation sections 160 and 165, and an RF transmitting circuit 170.

The input formatting block 110 encapsulates and compresses each of a plurality of pieces of input data to generate a BBP. The plurality of pieces of data obtained by partitioning a stream such as a video stream in fixed units is input to this input formatting block 110.

In the ATSC 3.0 standard, data is transmitted herein in data structures called PLPs (Physical Layer Pipes). Furthermore, the transmitting side is required to be capable of transmitting up to 64 PLPs, and the receiving side is required to be capable of simultaneously processing up to four PLPs.

The input formatting block 110 encapsulates and compresses each data and generates ALP (ATSC Link layer Protocol) packets. The input formatting block 110 then partitions an ALP group including the ALP packets corresponding to each PLP into a plurality of parts per PLP, and generates BBPs each storing partitioned data in a payload. The input formatting block 110 supplies a stream containing those BBPs to the stream partitioning block 120.

The stream partitioning block 120 partitions the stream according to the number of frequency channels used in channel bonding. It is assumed herein that the stream is transmitted to the stream partitioning block 120 via two frequency channels. The stream partitioning block 120 partitions the stream into two in BBP units, supplies one of the partitioned data to the BICM block 130, and supplies the other partitioned data to the BICM block 135.

The BICM blocks 130 and 135 each encode a plurality of BBPs corresponding to each PLP and perform bit interleaving on the plurality of encoded BBPs per PLP, and output a plurality of cells. The BICM block 130 outputs a cell group corresponding to each PLP to the framing and interleaving block 150, while the BICM block 135 outputs a cell group corresponding to each PLP to the framing and interleaving block 155.

The framing and interleaving blocks 150 and 155 each perform time interleaving and frequency interleaving on the cell group corresponding to each PLP, and generate a symbol group configuring an OFDM frame. The framing and interleaving block 150 outputs the symbol group corresponding to an OFDM frame to the waveform generation section 160. Meanwhile, the framing and interleaving block 155 outputs the symbol group corresponding to an OFDM frame to the waveform generation section 165.

The waveform generation sections 160 and 165 each generate the OFDM frame by performing pilot signal insertion, inverse fast fourier transform (IFFT), guard interval insertion, and the like. The waveform generation sections 160 and 165 each output the OFDM frame to the RF transmitting circuit 170.

The RF transmitting circuit 170 transmits the OFDM frame from the waveform generation section 160 and the OFDM frame from the waveform generation section 165 via frequency channels different from each other. This RF transmitting circuit 170 transmits the OFDM frame from the waveform generation section 160 from, for example, the antenna 180 via a frequency channel CH1. Further, the RF transmitting circuit 170 transmits the OFDM frame from the waveform generation section 165 from, for example, the antenna 180 via a frequency channel CH2. It is noted that two RF receiving circuits and two antennas can be disposed as described later.

It is noted that frequency bands of the frequency channels CH1 and CH2 are not necessarily adjacent to each other. Moreover, while transmitting the OFDM frames via the two frequency channels at the time of using the channel bonding, the transmitting apparatus 100 is capable of transmitting the OFDM frames via three or more frequency channels. Further, processing within the transmitting apparatus 100 is described in "'ATSC Standard: Physical Layer Protocol Doc. A/322:2017,' Advanced Television Systems Committee, Internet (https://www.atsc.org/standards/atsc-3-0-standards/)."

Figure 3:
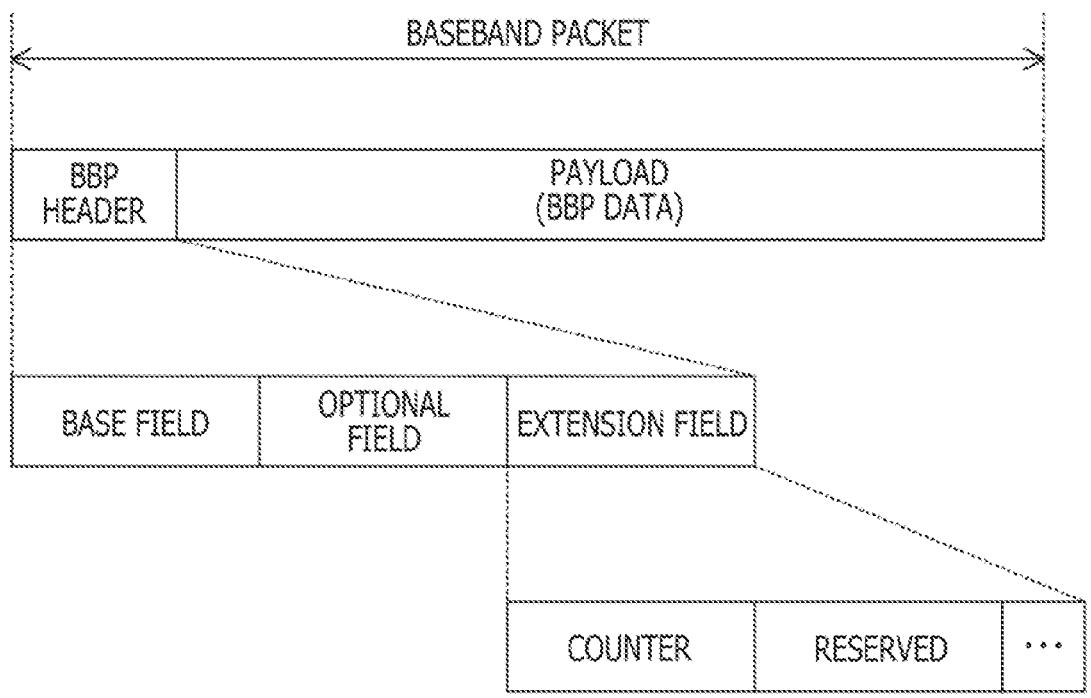
FIG. 3 is a diagram depicting an example of a data structure of a baseband packet according to the first embodiment of the present technology.

FIG. 3 is a diagram depicting an example of a data structure of the baseband packet (BBP) according to the first embodiment of the present technology. This BBP contains a BBP header and a payload. A base field, an optional field, and an extension field are provided in the BBP header. Moreover, a counter region and a reserved region are provided in the extension field. This counter takes on a value incrementing linearly by one for each BBP within one PLP, and an independent counter is used for every PLP. The counter within the extension field will be referred to as an "extension counter," hereinafter. Further, data stored in the payload will be referred to as "BBP data."

Figure 4:
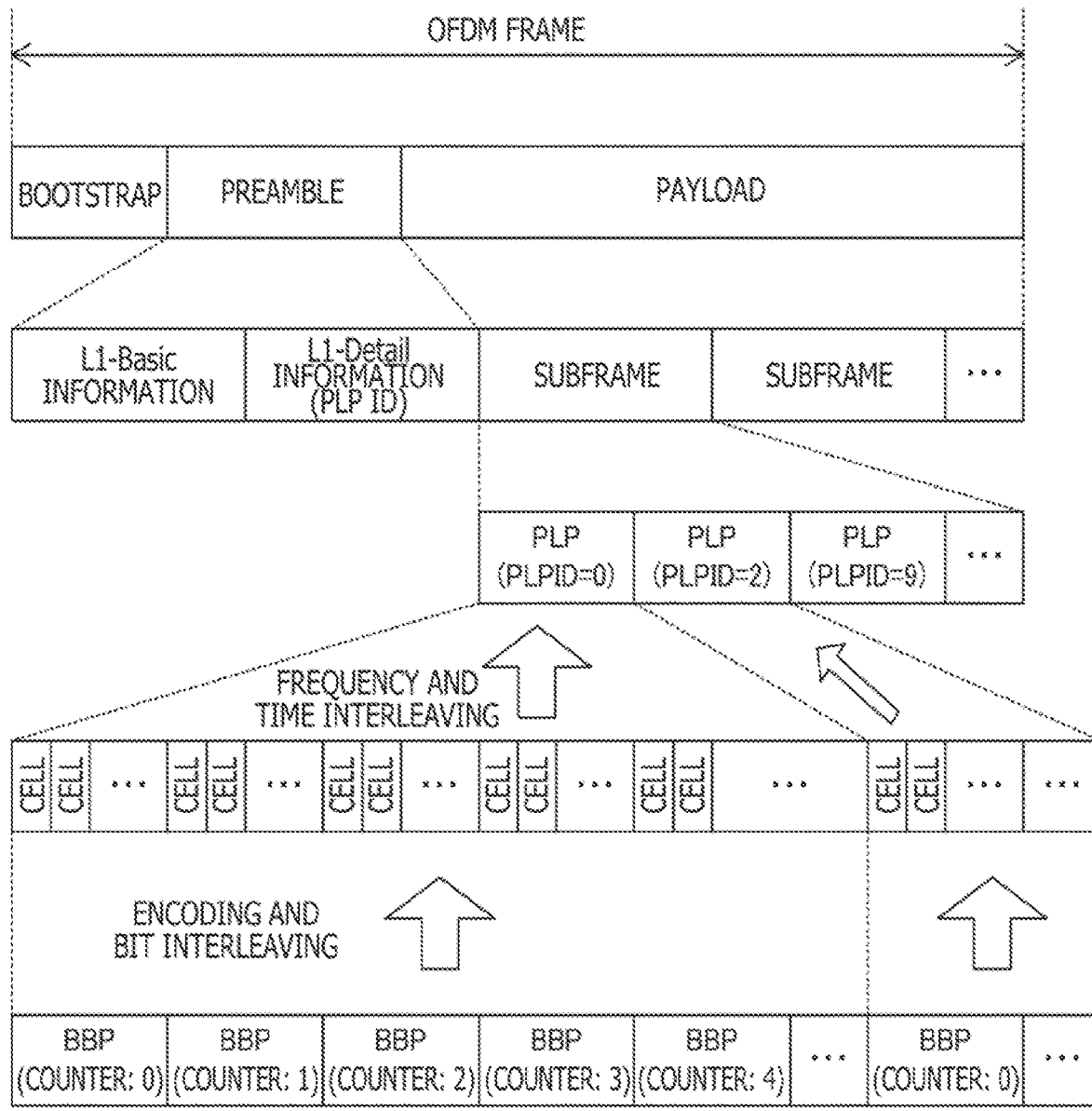
FIG. 4 is a diagram depicting an example of a data structure of an OFDM (Orthogonal Frequency Division Multiplexing) frame according to the first embodiment of the present technology.

FIG. 4 is a diagram depicting an example of a data structure of the OFDM frame according to the first embodiment of the present technology. The OFDM frame contains a bootstrap, a preamble, and a payload. L1 information including L1-Basic information and L1-Detail information is stored in the preamble. A pilot signal encoding scheme and the like are stored in the L1-Basic information. The L1-Detail information will be described later in detail. Up to 256 subframes are stored in the payload. In addition, up to 64 PLPs are stored in each of the subframes.

The BICM blocks 130 and the like each perform encoding and bit interleaving on a BBP group corresponding to each PLP and generate a cell group corresponding to each PLP. Then, the framing and interleaving blocks 150 and the like perform frequency interleaving and time interleaving on the cell group corresponding to each PLP while generating the preamble, and generate a symbol group configuring an OFDM.

FIG. 5 is a diagram depicting an example of a syntax of the L1-Detail information according to the first embodiment of the present technology. This syntax is described in 'ATSC Standard: Physical Layer Protocol Doc. A/322:2017,' Advanced Television Systems Committee, Internet (https://www.atsc.org/standards/atsc-3-0-standards/).'

An "L1D_plp_id" field is provided in a portion 601 surrounded by a broken line within the L1-Detail information. Identification information regarding one PLP is described in this "L1D_plp_id" field.

Further, an "L1D_plp_start" field in which an index of the first cell within the current PLP within the current subframe is described is provided in a portion 602. An "L1D_plp_fec_type" field in which an encoding scheme in forward error correction (FEC) is described is provided in a portion 603.

An "L1D_plp_mod" field and an "L1D_plp_cod" field are provided in a portion 604. A modulation scheme used for the current PLP is described in the "L1D_plp_mod" field. A code rate for the current PLP is described in the "L1D_plp_cod" field.

An "L1D_plp_num_channel_bonded" field in which the number of frequencies involved in channel bonding of the current PLP is described is provided in a portion 605. It is to be noted, however, that a value in this field is a value obtained by excluding the frequency of the current channel. In a case of using, for example, two frequencies, "1" is set to the "L1D_plp_num_channel_bonded" field. By referring to the "L1D_plp_num_channel_bonded" field, the receiving apparatus 200 is capable of determining whether or not to perform channel bonding.

An "L1D_plp_channel_bonding_format" field in which a channel bonding format for the current PLP is described is provided in a portion 606.

Figure 6:
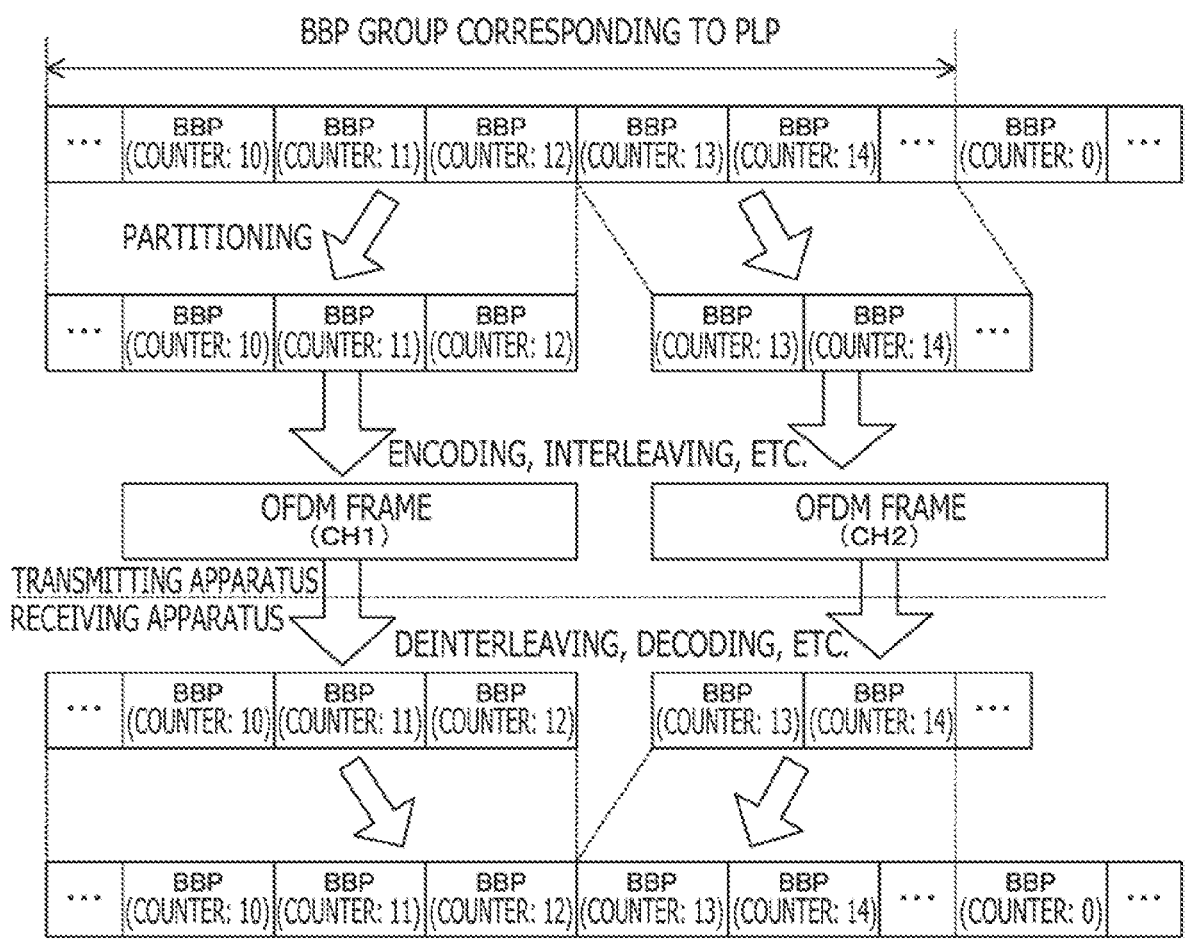
FIG. 6 is an explanatory diagram of stream partitioning according to the first embodiment of the present technology.

FIG. 6 is an explanatory diagram of stream partitioning according to the first embodiment of the present technology. It is supposed that a BBP group corresponding to a certain PLP is partitioned into two within a stream. In this BBP group, a value of the extension counter is allocated for each BBP, and the value is stored in the header of each BBP. The extension counter is initialized to zero for the top BBP within the PLP and increments by one for each BBP.

The stream partitioning block 120 partitions the BBP group corresponding to the PLP into, for example, a BBP group for which counter values are up to "12" and a BBP group for which counter values start at "13." The BICM block 130, the framing and interleaving block 150, and the waveform generation section 160 perform encoding, interleaving, and the like on the former BBP group to generate an OFDM frame corresponding to the frequency channel CH1. In contrast, the BICM block 135, the framing and interleaving block 155, and the waveform generation section 165 perform encoding, interleaving, and the like on the latter BBP group to generate an OFD frame corresponding to the frequency channel CH2.

The receiving apparatus 200 receives the OFDM frames described above via the frequency channels CH1 and CH2, and acquires the BBP group for which the counter values are up to "12" and the BBP group for which the counter values start at "13" by performing processing corresponding to the transmitting-side processing. Then, the receiving apparatus 200 reconstructs the original stream by arranging (in other words, bonding together) those BBPs in the order of the counter values. In this way, the receiving apparatus 200 is capable of bonding the BBPs corresponding to the frequency channel CH1 and the BBPs corresponding to the frequency channel CH2 together by referring to the value of the extension counter within each BBP.

[Example of Configurations of Integrated Circuits]

Figure 7:
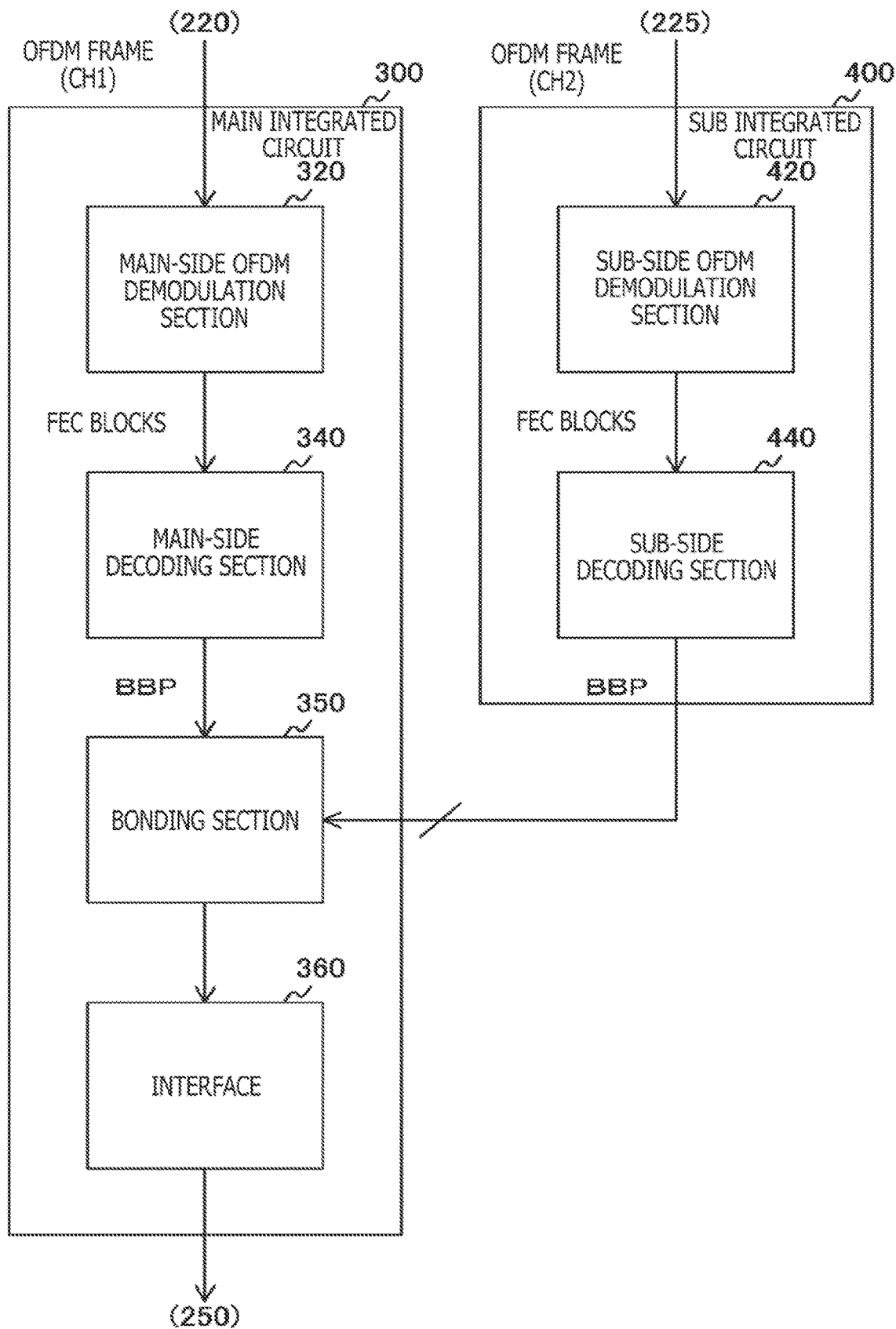
FIG. 7 is a block diagram depicting an example of configurations of a main integrated circuit and a sub integrated circuit according to the first embodiment of the present technology.

FIG. 7 is a block diagram depicting an example of configurations of the main integrated circuit 300 and the sub integrated circuit 400 according to the first embodiment of the present technology. The main integrated circuit 300 includes a main-side OFDM demodulation section 320, a main-side decoding section 340, a bonding section 350, and an interface 360. In addition, the sub integrated circuit 400 includes a sub-side OFDM demodulation section 420 and a sub-side decoding section 440.

The sub-side OFDM demodulation section 420 demodulates the OFDM frame from the RF receiving circuit 225, acquires the L1 information and the FEC block group corresponding to each PLP, and supplies the L1 information and the FEC block group to the sub-side decoding section 440. This sub-side OFDM demodulation section 420 performs processing corresponding to the processing by the framing and interleaving block 155 and the waveform generation section 165 within the transmitting apparatus 100, and generates the cell group corresponding to each PLP. Then, the sub-side OFDM demodulation section 420 generates the FEC block group corresponding to each PLP by performing deinterleaving corresponding to the interleaving performed within the BICM block 135. It is noted that the sub-side OFDM demodulation section 420 is an example of a first demodulation section set forth in the claims.

The sub-side decoding section 440 decodes the FEC blocks corresponding to each PLP, acquires BBPs, and outputs the BBPs to the bonding section 350. This sub-side decoding section 440 performs decoding processing corresponding to encoding performed within the BICM block 135 in the transmitting apparatus 100. It is noted that the sub-side decoding section 440 is an example of a first decoding section set forth in the claims.

The main-side OFDM demodulation section 320 demodulates the OFDM frame from the RF receiving circuit 220, acquires the L1 information and the FEC block group corresponding to each PLP, and supplies the L1 information and the FEC block group to the main-side decoding section 340. It is noted that the main-side OFDM demodulation section 320 is an example of a second demodulation section set forth in the claims.

The main-side decoding section 340 decodes the FEC blocks corresponding to each PLP, acquires BBPs, and outputs the BBPs to the bonding section 350. It is noted that the main-side decoding section 340 is an example of a second decoding section set forth in the claims.

The bonding section 350 bonds the BBP group from the main-side decoding section 340 and the BBP group from the sub-side decoding section 440 together, and reconstructs the original stream. This bonding section 350 supplies bonded decoded data to the decoded data processing section 250 via the interface 360.

It is noted herein that, under the ATSC 3.0 standard, the channel bonding is not essential but selectively used as needed. For example, whether or not to use the channel bonding varies depending on a district. Owing to this, the receiving apparatus 200 from which the sub integrated circuit 400 is eliminated is supplied to a user in a district where it is estimated that the channel bonding is not used. Eliminating the sub integrated circuit 400 makes it possible to greatly reduce a cost of the receiving apparatus 200. While circuit groups provided in each of the main integrated circuit 300 and the sub integrated circuit 400 can be mounted in one integrated circuit, this configuration causes cost increase, compared with the configuration in which only the sub integrated circuit 400 is eliminated.

Moreover, both an integrated circuit that uses the channel bonding and an integrated circuit that does not use the channel bonding can be designed individually; however, this unfavorably imposes a heavy burden on a designer. Providing a circuit necessary for the channel bonding in the main integrated circuit 300 and the sub integrated circuit 400 in a distributed fashion makes it possible to facilitate providing both the receiving apparatus 200 that uses the channel bonding and a receiving apparatus that does not use the channel bonding.

Figure 8:
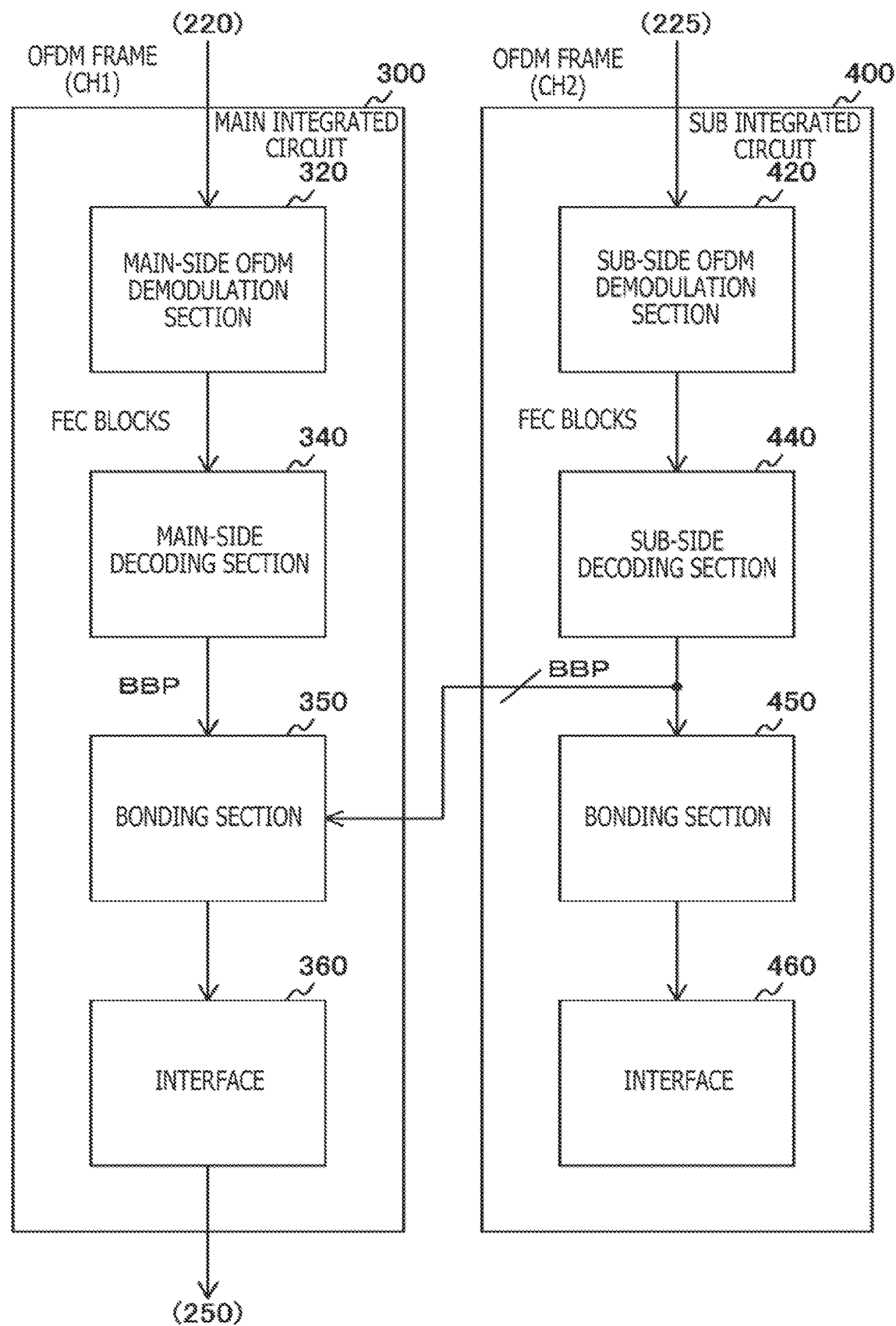
FIG. 8 is a block diagram depicting an example of configurations of a main integrated circuit and a sub integrated circuit configured similarly to the main integrated circuit according to the first embodiment of the present technology.

While the bonding section and the interface are not provided in the sub integrated circuit 400 in FIG. 7, these circuits can also be provided in the sub integrated circuit 400 as exemplarily depicted in FIG. 8.

Further, the channel bonding is not always used during broadcasting even in the district where the channel bonding is used. For example, the channel bonding is used only at a time of transmission of high-definition content. The receiving apparatus 200 determines whether or not to perform the channel bonding by referring to "L1D_plp_num_channel_bonded." Then, in a case of not performing the channel bonding, the receiving apparatus 200 sets the sub integrated circuit 400 to be disabled to stop the sub integrated circuit 400. This can achieve saving of power consumption.

Moreover, with configurations depicted in FIG. 8, each of the main integrated circuit 300 and the sub integrated circuit 400 is capable of detecting whether or not a failure occurs by a self-diagnosis. In addition, at a time of occurrence of a failure in one of the integrated circuits, the other integrated circuit sets the failed integrated circuit to be disabled. With the configurations depicted in FIG. 8, it is possible to output a stream even by the sub integrated circuit 400 only. This can improve reliability of the receiving apparatus 200.

[Example of Configuration of Decoding Section]

Figure 9:
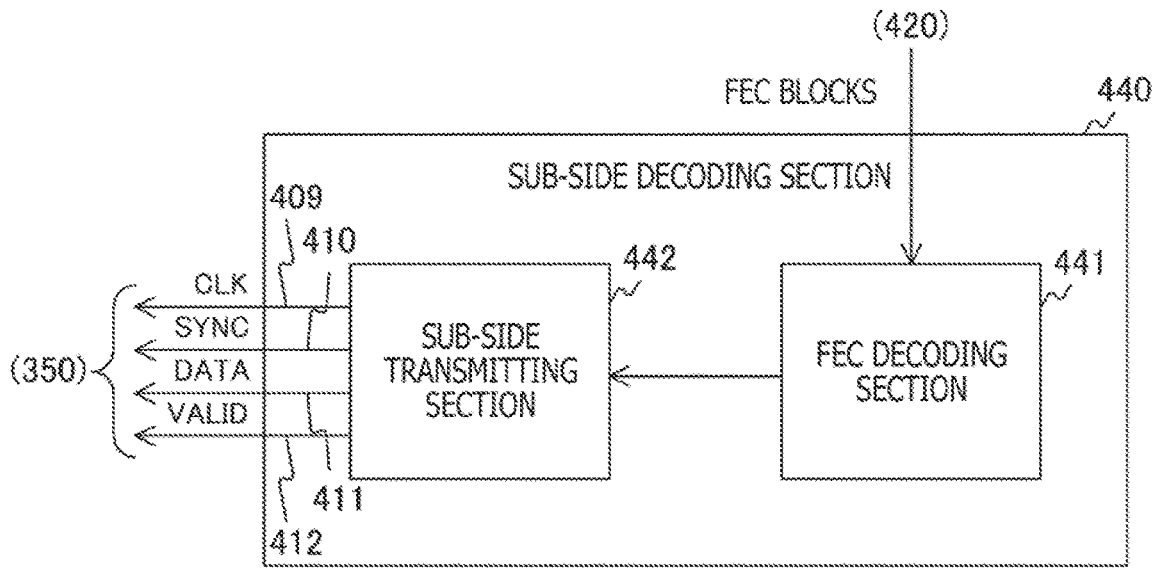
FIG. 9 is a block diagram depicting an example of a configuration of a sub-side decoding section according to the first embodiment of the present technology.

FIG. 9 is a block diagram depicting an example of a configuration of the sub-side decoding section 440 according to the first embodiment of the present technology. This sub-side decoding section 440 includes an FEC decoding section 441 and a sub-side transmitting section 442.

The FEC decoding section 441 decodes the FEC blocks and generates the BBPs. This FEC decoding section 441 supplies a BBP group corresponding to each PLP to the sub-side transmitting section 442.

The sub-side transmitting section 442 adds header information to the BBP group and transmits the BBP group with the header information to the bonding section 350. This sub-side transmitting section 442 is connected to the bonding section 350 via a clock line 409, a sync line 410, a data line 411, and a valid line 412. The clock line 409 is a signal line for transmitting a clock signal CLK. The sync line 410 is a signal line for transmitting a synchronizing signal SYNC. The data line 411 is a signal line for transmitting a data signal DATA such as the header information and the BBP data. While the physical number of data lines 411 is two or more at a time of parallel transfer, the physical number of data lines 411 is one at a time of serial transfer. For the sake of convenience, it is assumed hereinafter that the number of data lines 411 is one even in the case of the parallel transfer. The valid line 412 is a signal line for transmitting a data valid signal VALID indicating whether or not data being transmitted is valid.

Figure 10:
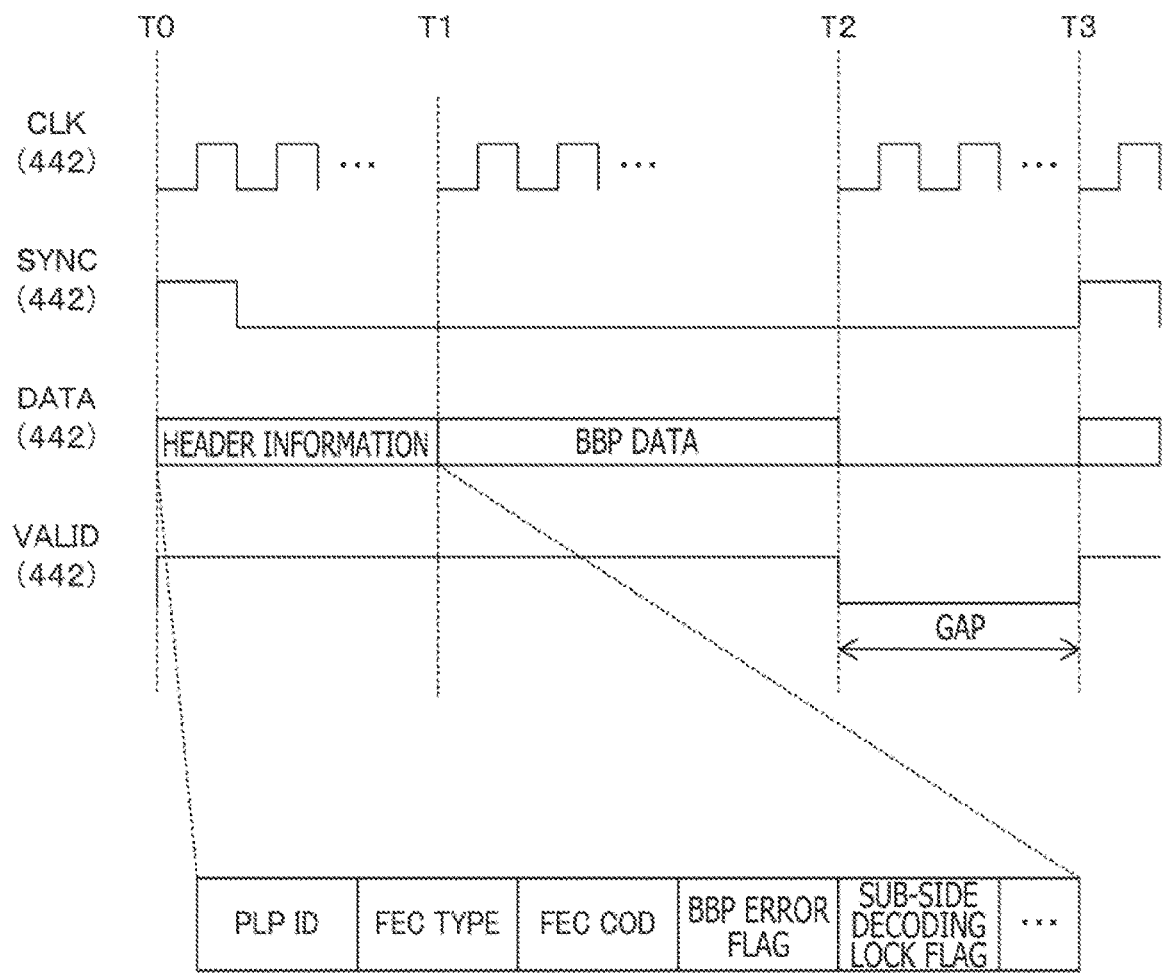
FIG. 10 is an example of a timing chart illustrating data transfer control according to the first embodiment of the present technology.

FIG. 10 is an example of a timing chart illustrating data transfer control according to the first embodiment of the present technology. The sub-side transmitting section 442 generates the clock signal CLK at a predetermined frequency and transmits the clock signal CLK to the sub-side.

First, at timing T0 of starting data transmission, the sub-side transmitting section 442 transmits the synchronizing signal SYNC for synchronization with the receiving side. Moreover, the sub-side transmitting section 442 transmits the header information in a period from the timing T0 to T1, and transmits the BBP data in a period from the timing T1 to T2 in synchronization with the clock signal CLK. At and after timing T3, the sub-side transmitting section 442 transmits next header information and next BBP data. A period from the timing T2 to T3 is a gap period in which valid data is not transmitted. The data valid signal VALID is set to a low level in this period and set to a high level in other periods.

The header information contains, for example, identification information regarding the PLPs, an encoding scheme and a code rate, a BBP error flag, and a sub-side decoding lock flag. In FIG. 10, "PLP ID" indicates the identification information regarding each PLP and "FEC TYPE" indicates the encoding scheme. In addition, "FEC COD" indicates the code rate.

A value in the "L1D_plp_id" field within the LL1 information is set to the "PLP ID." This identification information is used in a case of using M-PLPs.

In addition, a value in the "L1D_plp_fec_type" field within the L1 information is set to the "FEC TYPE." A value in the "L1D_plp_cod" field within the L1 information is set to the "FEC COD." These pieces of information are used at the time of bonding.

The BBP error flag indicates whether or not an error is detected at the time of decoding the FEC blocks and acquiring the BBPs by the sub-side decoding section 440. The sub-side decoding lock flag indicates whether or not the number of times of continuous determination that the error is not present is equal to or greater than a predetermined number of times at a time of decoding by the sub-side decoding section 440. For example, the sub-side decoding lock flag is set to on when the number of times of continuous determination that the error is not present is equal to or greater than the predetermined number of times. These flags are generated by the sub-side decoding section 440 and used at the time of bonding.

The receiving-side bonding section 350 detects a top of the header information by the synchronizing signal SYNC, and receives data in synchronization with the clock signal CLK in a period in which the data valid signal VALID is at the high level.

It is noted that the header information and the BBP data are transmitted from the main-side decoding section 340 also to the bonding section 350, similarly to the sub-side decoding section 440. It is to be noted, however, that the header information from the main-side decoding section 340 contains a main-side decoding lock flag as an alternative to the sub-side decoding lock flag.

Figure 11:
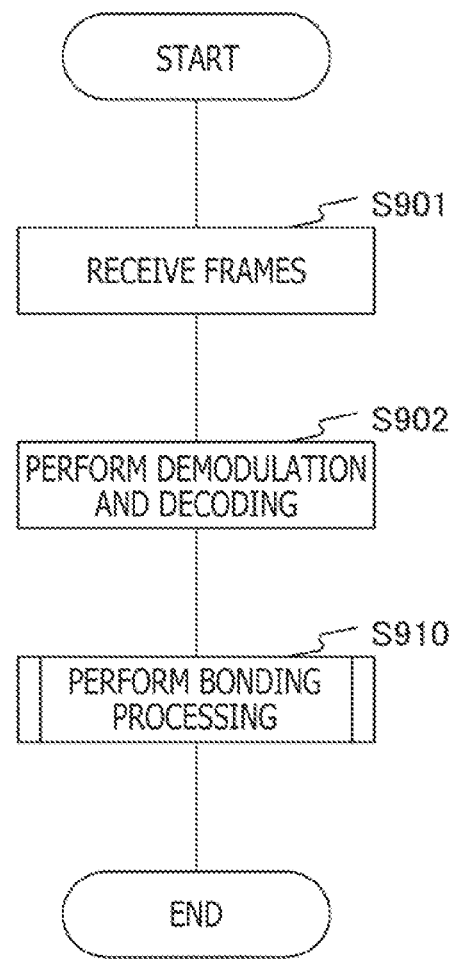
FIG. 11 is a flowchart illustrating an example of receiving processing by a receiving apparatus according to the first embodiment of the present technology.

FIG. 11 is a flowchart illustrating an example of receiving processing by the receiving apparatus 200 according to the first embodiment of the present technology. This receiving processing is started, for example, at a time when a predetermined application for the receiving apparatus 200 to receive broadcasting data has been executed.

The RF receiving circuits 220 and 225 within the receiving apparatus 200 receive the OFDM frames via the frequency channels different from each other (Step S901). The sub integrated circuit 400 and the main integrated circuit 300 demodulate and decode the corresponding OFDM frames to acquire the BBPs (Step S902). Then, the main integrated circuit 300 executes bonding processing for bonding the BBPs together (Step S910). After Step S910, the receiving apparatus 200 ends the receiving processing.

Figure 12:
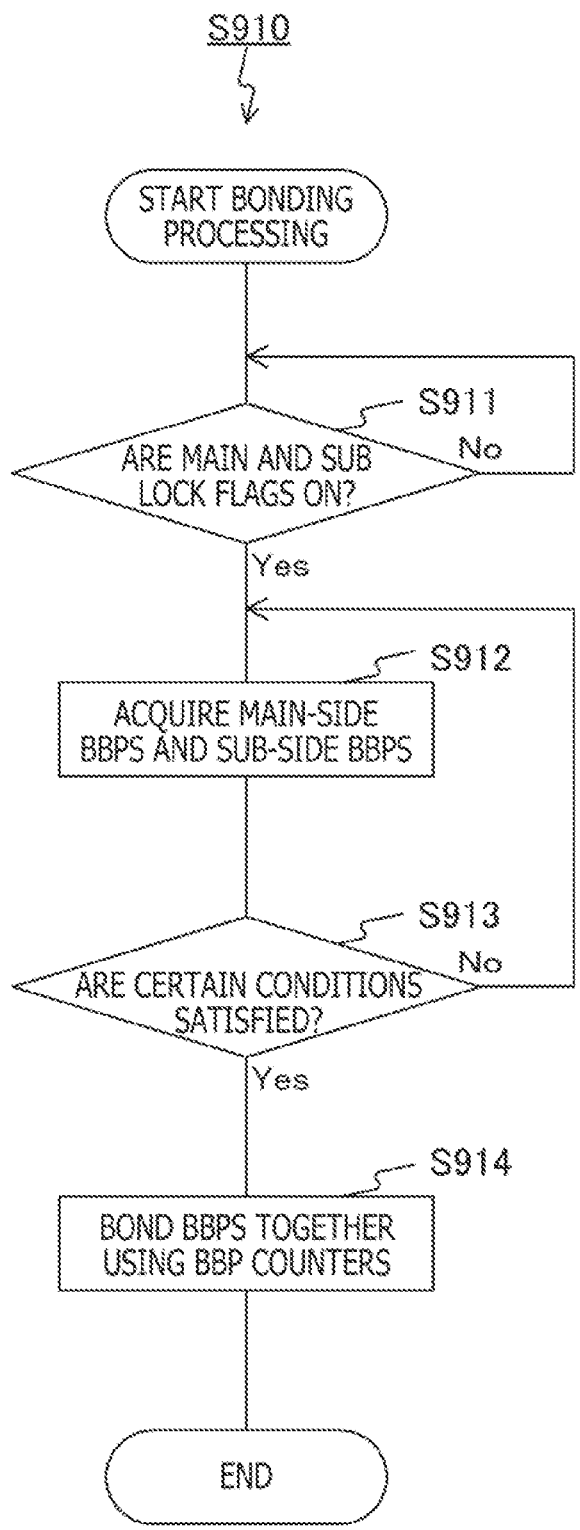
FIG. 12 is a flowchart illustrating an example of bonding processing by the receiving apparatus according to the first embodiment of the present technology.

FIG. 12 is a flowchart illustrating an example of the bonding processing by the receiving apparatus 200 according to the first embodiment of the present technology. The bonding section 350 determines whether or not both the main-side decoding lock flag and the sub-side decoding lock flag are set to on (Step S911). In a case in which at least one of the main-side decoding lock flag or the sub-side decoding lock flag is set to off (Step S911: No), the bonding section 350 repeats Step S911 and subsequent steps.

Conversely, in a case in which both the main-side decoding lock flag and the sub-side decoding lock flag are set to on (Step S911: Yes), the bonding section 350 acquires the main-side BBPs and the sub-side BBPs (Step S912).

Then, the bonding section 350 determines whether or not certain conditions for bonding are satisfied (Step S913). For example, whether or not the following three conditions are all satisfied is determined.

(1) An error is not present in the main-side BBPs and an error is not present in the sub-side BBPs.

(2) Both the main-side encoding scheme and the main-side code rate match the sub-side encoding scheme and the sub-side code rate.

(3) (A value of each main-side extension counter)==(Value of each sub-side extension counter)+1, or (A value of each main-side extension counter)==(Value of each sub-side extension counter)−1.

In a case in which certain conditions are not satisfied (Step S913: No), the bonding section 350 repeats Step S912 and subsequent steps. Conversely, in a case in which certain conditions are satisfied (Step S913: Yes), the bonding section 350 bonds the BBPs together using the extension counters and reconstructs the original stream (Step S914). After Step S914, the bonding section 350 ends the bonding processing.

In this way, according to the first embodiment of the present technology, the sub integrated circuit 400 outputs the BBPs in the channel CH2, and the main integrated circuit 300 acquires the BBPs in the channel CH1 and bonds the BBPs in the channel CH1 and the BBPs in the channel CH2 together. It is thereby possible to realize the channel bonding compliant with the ATSC 3.0 standard.

[Modification]

While the sub integrated circuit 400 transmits data via the four signal lines including the clock line 409, the sync line 410, the data line 411, and the valid line 412 in the first embodiment described above, it is desirable that the number of wired signal lines is smaller, from the viewpoint of cost reduction. The sub integrated circuit 400 according to this modification of the first embodiment differs from the sub integrated circuit 400 according to the first embodiment by transmitting data via three or less signal lines.

Figure 13:
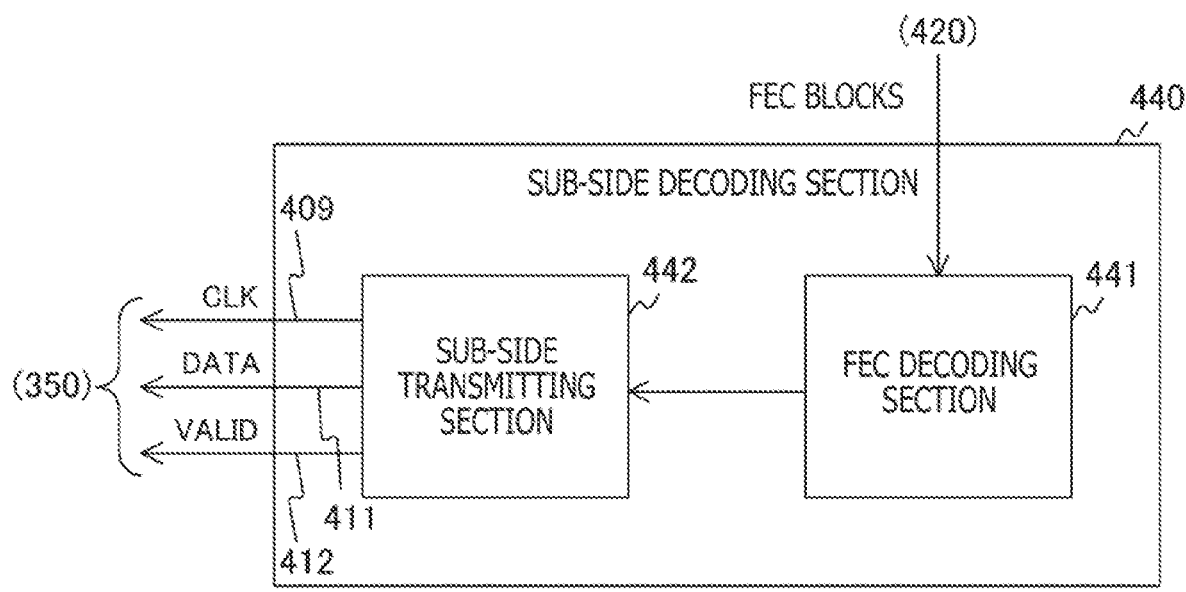
FIG. 13 is a block diagram depicting an example of a configuration of a sub-side decoding section according to a modification of the first embodiment of the present technology.

FIG. 13 is a block diagram depicting an example of a configuration of the sub-side decoding section 440 according to the modification of the first embodiment of the present technology. The sub-side decoding section 440 according to this modification of the first embodiment differs from the sub-side decoding section 440 according to the first embodiment in that the sub-side decoding section 440 is connected to the main-side bonding section 350 via the three signal lines including the clock line 409, the data line 411, and the valid line 412.

Figure 14:
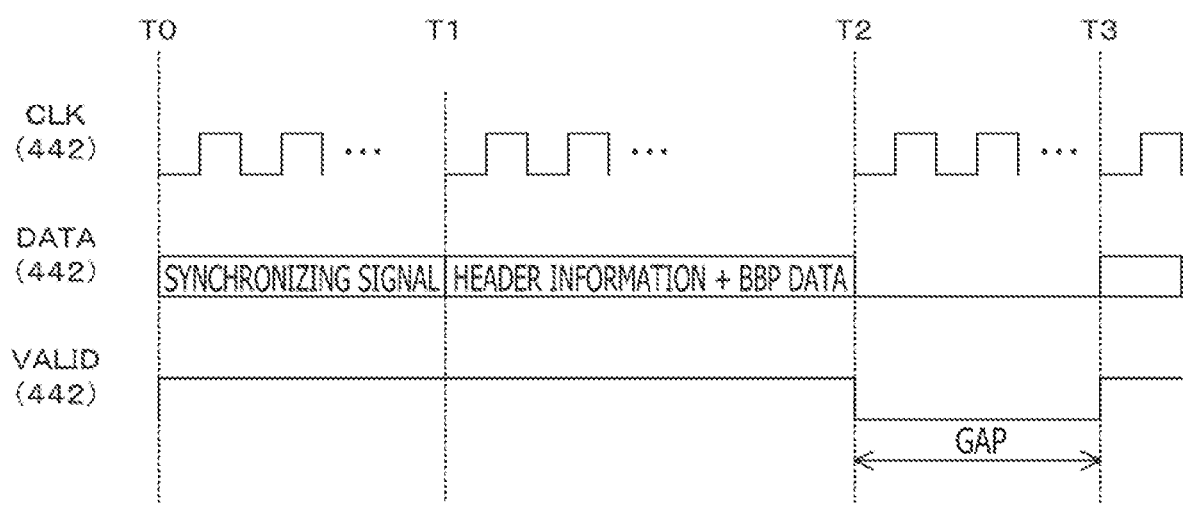
FIG. 14 is an example of a timing chart illustrating data transfer control according to the modification of the first embodiment of the present technology.

FIG. 14 is an example of a timing chart illustrating data transfer control according to the modification of the first embodiment of the present technology. In this modification of the first embodiment, the sub-side decoding section 440 transmits a synchronizing signal for a predetermined data sequence in the period from the timing T0 to T1 via the data line 411. Subsequently, the sub-side decoding section 440 transmits the header information and the BBP data in the period from the timing T1 to T2.

It is to be noted that, while the sub-side decoding section 440 transmits the data valid signal VALID, the sub-side decoding section 440 can also be configured not to transmit the data valid signal VALID. With this configuration, it is unnecessary to wire the valid line 412, and the sub-side decoding section 440 is capable of transmitting data only via the clock line 409 and the data line 411. In this case, the sub-side decoding section 440 may continuously transmit the data without providing the gap period.

FIG. 15 is a diagram depicting an example of data transfer patterns according to the first embodiment of the present technology and the modification of the first embodiment of the present technology. In the first embodiment, the clock signal CLK, the data signal DATA (such as the header information and the BBP data), the synchronizing signal SYNC, and the data valid signal VALID are transmitted from the sub side to the main side via the four signal lines.

In the modification of the first embodiment, the clock signal CLK, the data signal DATA, and the data valid signal VALID are transmitted from the sub side to the main side via the three signal lines. It is noted that the receiving apparatus 200 may be configured in such a manner that the clock signal CLK and the data signal DATA are transmitted from the sub side to the main side via the two signal lines, as described above. Moreover, the receiving apparatus 200 may be configured in such a manner that the clock signal CLK, the data signal DATA, and the synchronizing signal SYNC are transmitted from the sub side to the main side via the three signal lines. In this case, the sub-side decoding section 440 may continuously transmit the data without providing the gap period.

In this way, according to the modification of the first embodiment of the present technology, it is possible to omit the sync line 410 for transmitting the synchronizing signal since the sub-side decoding section 440 transmits the synchronizing signal via the data line 411.

2. Second Embodiment

While the receiving apparatus 200 receives the data via a plurality of frequency channels in the first embodiment described above, there is a concern of reduction in SNR (Signal-Noise Ratio) at a time of occurrence of a transmission error due to a radio disturbance or the like. The receiving apparatus 200 according to the second embodiment differs from that according to the first embodiment in that an SNR is improved by performing cell exchange.

Figure 16:
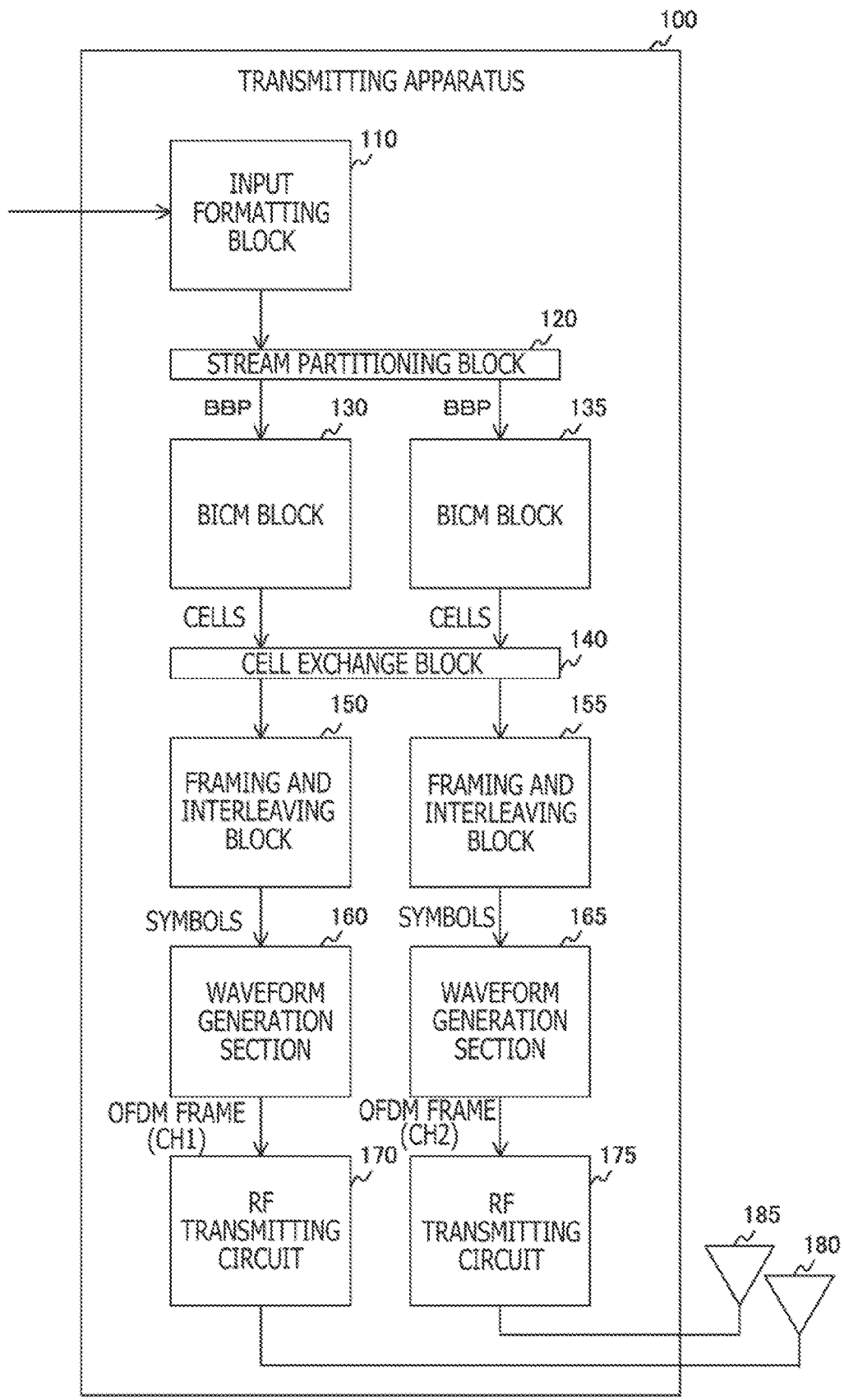
FIG. 16 is a block diagram depicting an example of a configuration of a transmitting apparatus according to a second embodiment of the present technology.

FIG. 16 is a block diagram depicting an example of a configuration of the transmitting apparatus 100 according to the second embodiment of the present technology. This transmitting apparatus 100 differs from that according to the first embodiment in that the transmitting apparatus 100 further includes a cell exchange block 140, an RF transmitting circuit 175, and an antenna 185.

The cell exchange block 140 exchanges cells between frequency channels different from each other. This cell exchange block 140 is inserted between the BICM blocks 130 and 135 and the framing and interleaving blocks 150 and 155. The cell exchange block 140 performs exchange between odd-numbered cells in the frequency channel CH1 and odd-numbered cells in the frequency channel CH2 in the cell group corresponding to each PLP. In contrast, the cell exchange block 140 does not perform exchange between even-numbered cells in the frequency channel CH1 and even-numbered cells in the frequency channel CH2. The cell exchange block 140 outputs the unexchanged even-numbered cells or the exchanged odd-numbered cells to the framing and interleaving blocks 150 and 155. Moreover, the RF transmitting circuit 170 transmits the OFDM frame from the waveform generation section 160 from the antenna 180, while the RF transmitting circuit 175 transmits the OFDM frame from the waveform generation section 165 from the antenna 185.

Under the ATSC 3.0, cell exchange is not essential but performed as needed. The receiving side is capable of recognizing whether or not the transmitting side has performed the cell exchange by referring to the "L1D_plp_channel_bonding_format" within the L1 information.

Figure 17A:
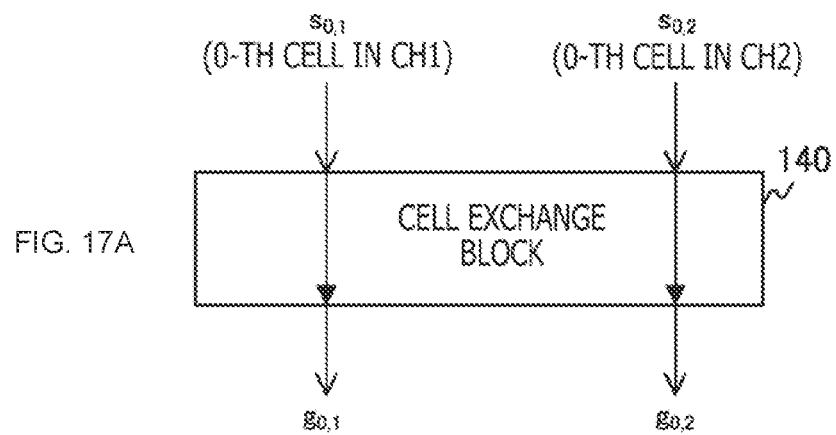
FIGS. 17A, 17B, and 17C depict explanatory diagrams of cell exchange procedures according to the second embodiment of the present technology.
Figure 17B:
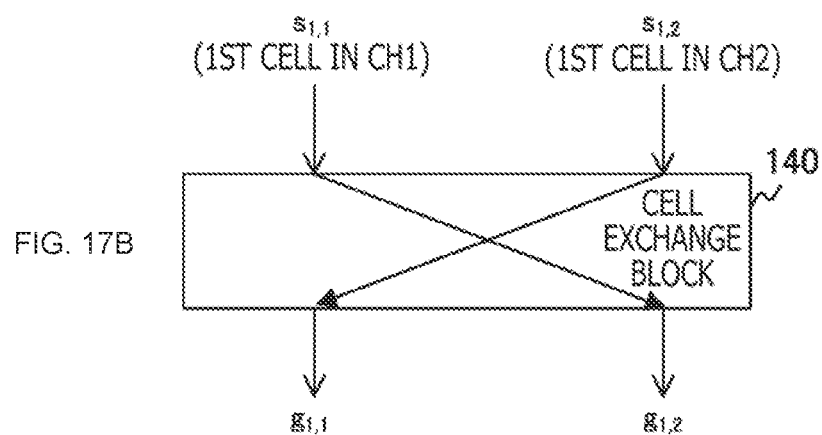
Figure 17C:
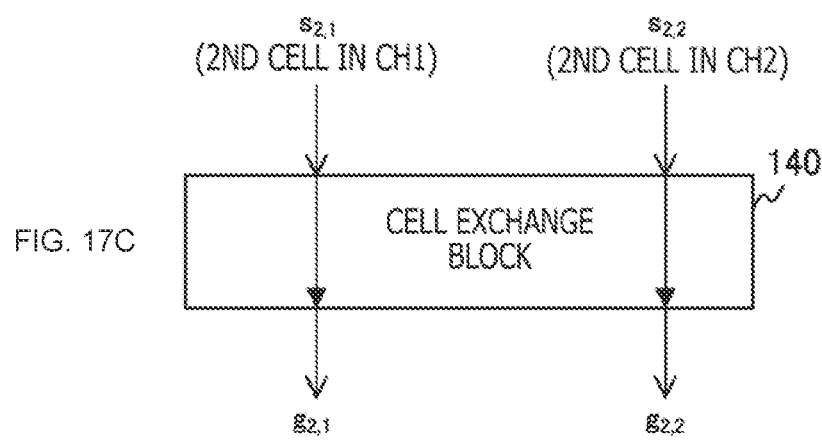

FIGS. 17A, 17B, and 17C depict explanatory diagrams of cell exchange procedures according to the second embodiment of the present technology. In FIGS. 17A, 17B, and 17C, Subfigure a indicates processing on a first cell by the cell exchange block 140. In FIGS. 17A, 17B, and 17C, Subfigure b indicates processing on a second cell by the cell exchange block 140. In FIGS. 17A, 17B, and 17C, Subfigure c indicates processing on a third cell by the cell exchange block 140.

A cell input to the cell exchange block 140 will be referred herein to as an "input cell," and a cell output from the cell exchange block 140 will be referred herein to as an "output cell." In addition, an i-th input cell in the cell group corresponding to each PLP in the frequency channel CH1 will be referred to as "$s_{i,1}$." If the number of cells configuring the PLPs is assumed as $N_{CELL}$ (where $N_{CELL}$ is an integer), i is an input index of each of integers from 1 to $N_{CELL}$. An i-th input cell in the cell group corresponding to each PLP in the frequency channel CH2 will be referred to as "$s_{i,2}$."

Moreover, an i-th output cell in the cell group corresponding to the each PLP in the frequency channel CH1 will be referred to as "$g_{i,1}$." An i-th output cell in the cell group corresponding to each PLP in the frequency channel CH2 will be referred to as "$g_{i,2}$." In a case in which i is an odd number, a relation between the input cell and the output cell is represented by the following Equation.

[Math. 1]

$$\begin{pmatrix} g_{i,1} \\ g_{i,2} \end{pmatrix} = \begin{pmatrix} 0 & 1 \\ 1 & 0 \end{pmatrix} \cdot \begin{pmatrix} s_{i,1} \\ s_{i,2} \end{pmatrix} \text{ for } i \text{ odd} \quad \text{(Equation 1)}$$

In contrast, in a case in which i is an even number, a relation between the input cell and the output cell is represented by the following Equation.

[Math. 2]

$$\begin{pmatrix} g_{i,1} \\ g_{i,2} \end{pmatrix} = \begin{pmatrix} 1 & 0 \\ 0 & 1 \end{pmatrix} \cdot \begin{pmatrix} s_{i,1} \\ s_{i,2} \end{pmatrix} \text{ for } i \text{ even} \quad \text{(Equation 2)}$$

According to Equation 2, a 0-th input cell s0,1 in the frequency channel CH1 is output as a 0-th output cell g0,1 in the frequency channel CH1, as exemplarily depicted in Subfigure FIG. 17A. Moreover, a 0-th input cell s0,2 in the frequency channel CH2 is output as a 0-th output cell g0,2 in the frequency channel CH2.

According to Equation 1, a first input cell s1,1 in the frequency channel CH1 is output as a first output cell g1,2 in the frequency channel CH2, as exemplarily depicted in Subfigure FIG. 17B. Moreover, a first input cell s1,2 in the frequency channel CH2 is output as a first output cell g1,1 in the frequency channel CH1.

According to Equation 2, a second input cell s2,1 in the frequency channel CH1 is output as a second output cell g2,1 in the frequency channel CH1, as exemplarily depicted in Subfigure FIG. 17C. Moreover, a second input cell s2,2 in the frequency channel CH2 is output as a second output cell g2,2 in the frequency channel CH2. Odd-numbered cells are similarly exchanged hereinafter, while even-numbered cells are output without being exchanged. Exchanging cells between the frequency channels in this way enables improvement in SNR.

Figure 18:
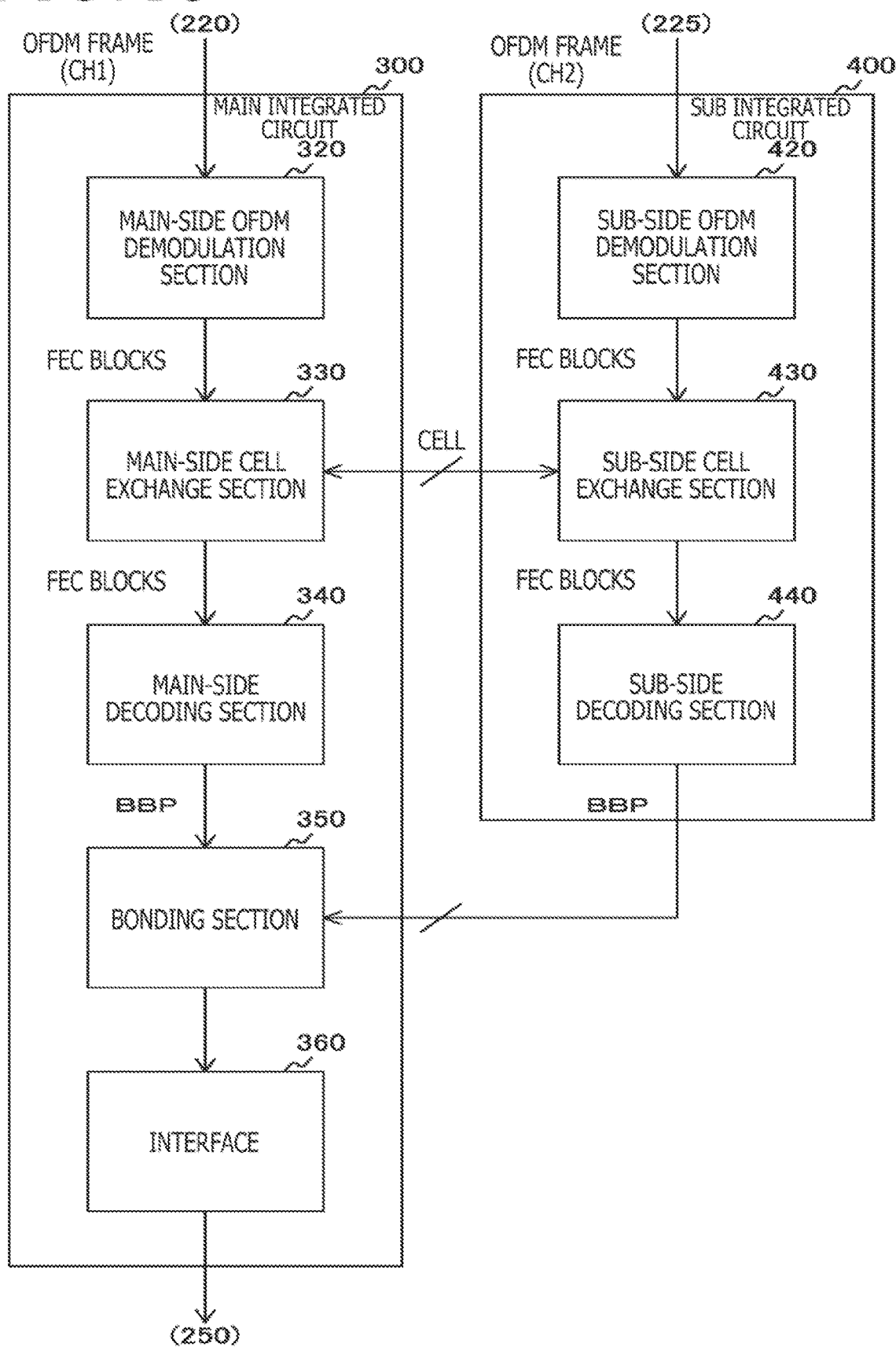
FIG. 18 is a block diagram depicting an example of a configuration of a main integrated circuit and a sub integrated circuit according to the second embodiment of the present technology.

FIG. 18 is a block diagram depicting an example of configurations of the main integrated circuit 300 and the sub integrated circuit 400 according to the second embodiment of the present technology. The main integrated circuit 300 according to the second embodiment differs from that according to the first embodiment in that the main integrated circuit 300 further includes a main-side cell exchange section 330. In addition, the sub integrated circuit 400 according to the second embodiment differs from that according to the first embodiment in that the sub integrated circuit 400 further includes a sub-side cell exchange section 430.

The main-side cell exchange section 330 acquires the input index of each cell and exchanges the cell with the sub-side cell in the case in which the input index is odd-numbered. In contrast, the main-side cell exchange section 330 does not exchange cells in the case in which the index is even-numbered. The main-side cell exchange section 330 supplies the exchanged cells or unexchanged cells to the main-side decoding section 340 in FEC block units. It is noted that the main-side cell exchange section 330 is an example of a second cell exchange section set forth in the claims.

The sub-side cell exchange section 430 acquires the input index of each cell and exchanges the cell with the main-side cell in the case in which the input index is odd-numbered. In contrast, the sub-side cell exchange section 430 does not exchange cells in the case in which the input index is even-numbered. The sub-side cell exchange section 430 supplies the exchanged cells or unexchanged cells to the sub-side decoding section 440 in FEC block units. It is noted that the sub-side cell exchange section 430 is an example of a first cell exchange section set forth in the claims.

Further, the main-side OFDM demodulation section 320 generates a main-side demodulation lock flag. In a case, for example, in which the number of times of success in demodulation exceeds a certain number of times, the main-side demodulation lock flag is set on. Likewise, the sub-side OFDM demodulation section 420 generates a sub-side demodulation lock flag.

Figure 19:
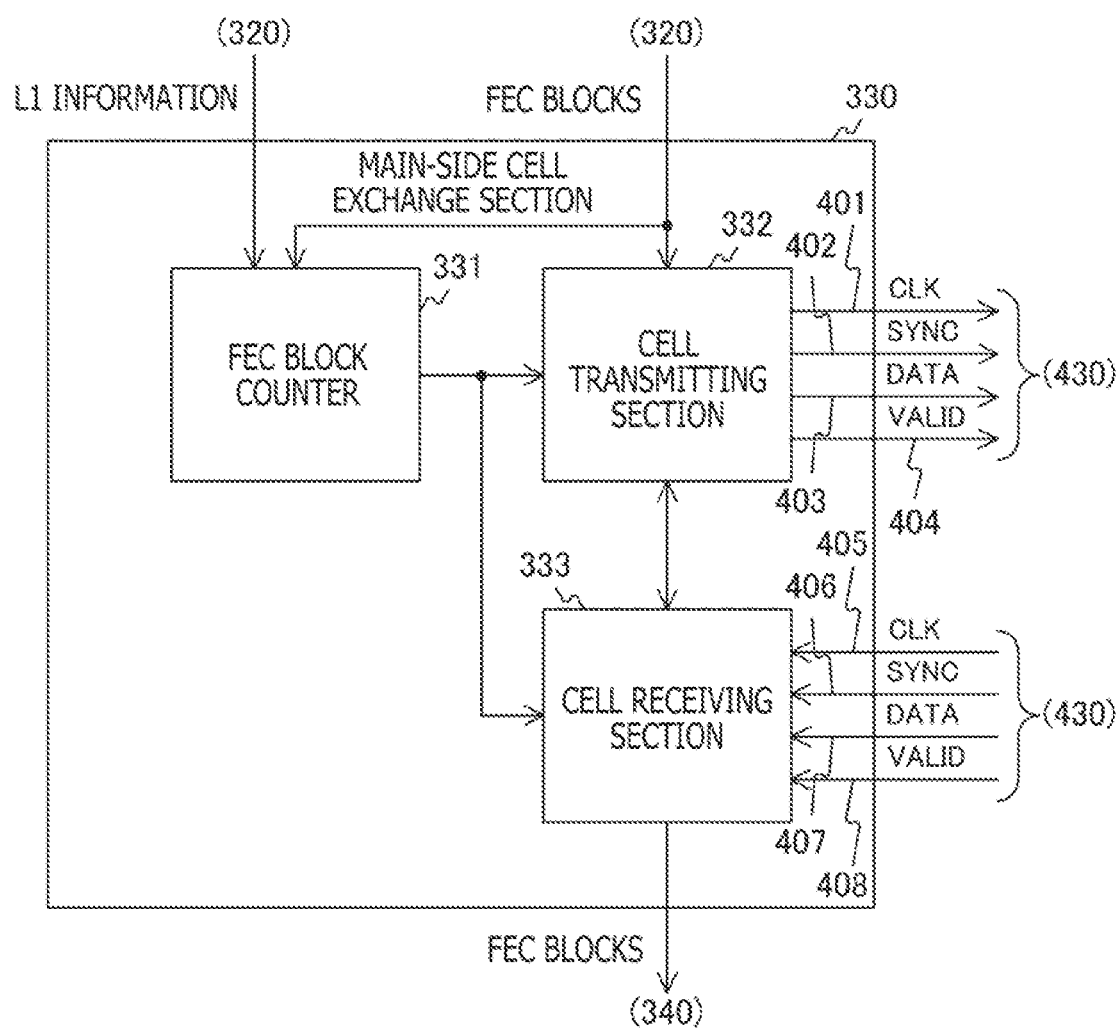
FIG. 19 is a block diagram depicting an example of a configuration of a main-side cell exchange section according to the second embodiment of the present technology.

FIG. 19 is a block diagram depicting an example of a configuration of the main-side cell exchange section 330 according to the second embodiment of the present technology. This main-side cell exchange section 330 includes an FEC block counter 331, a cell transmitting section 332, and a cell receiving section 333.

The FEC block counter 331 counts the number of times of input of FEC blocks input from the main-side OFDM demodulation section 320. This FEC block counter 331 refers to the "L1D_plp_start" within the L1 information, initializes a count value when the top FEC block within each PLP is input, and counts up the count value whenever an FEC block is input. The FEC block counter 331 supplies the count value of the FEC block counter as a FEC block counter value together with the L1 information to the cell transmitting section 332 and the cell receiving section 333.

The cell transmitting section 332 acquires the input index of each cell, and transmits the cell to the sub-side cell exchange section 430 in the case in which the input index is odd-numbered. The cell transmitting section 332 is connected to the sub-side cell exchange section 430 via a clock line 401, a sync line 402, a data line 403, and a valid line 404, and transmits the cell via these signal lines.

The cell transmitting section 332 acquires an encoding scheme and a code rate of the FEC blocks from the main-side L1 information. Then, the cell transmitting section 332 transmits the main-side encoding scheme, the main-side code rate, and the main-side demodulation lock flag together with the FEC block counter value to the sub side. Moreover, the cell transmitting section 332 receives a sub-side encoding scheme, a sub-side code rate, a sub-side demodulation lock flag, and the FEC block counter value from the cell receiving section 333.

The cell transmitting section 332 and the cell receiving section 333 start cell exchange in a case in which the main-side demodulation lock flag and the sub-side demodulation lock flag are on. The cell transmitting section 332 determines whether or not the main-side encoding scheme, the main-side code rate, and the FEC block counter value match the sub-side encoding scheme, the sub-side code rate, and the sub-side FEC block counter value, and obtains a size of each FEC block in cell units on the basis of those pieces of information in a case of determining that the main-side encoding scheme, the main-side code rate, and the FEC block counter value match the sub-side encoding scheme, the sub-side code rate, and the sub-side FEC block counter value.

Then, the cell transmitting section 332 partitions the FEC block in cell units, transmits the odd-numbered cells (cells with odd-numbered input indexes) to the sub side, and supplies the even-numbered cells (cells with even-numbered input indexes) to the cell receiving section 333.

The cell receiving section 333 receives the encoding scheme, the code rate, the sub-side demodulation lock flag, the FEC block counter value, and the cells from the sub-side cell exchange section 430. The cell receiving section 333 is connected to the sub-side cell exchange section 430 via a clock line 405, a sync line 406, a data line 407, and a valid line 408, and receives the cells and the like via those signal lines. The cell receiving section 333 supplies the received encoding scheme, the received code rate, the received sub-side demodulation lock flag, and the received FEC block counter value to the cell transmitting section 332. Then, the cell receiving section 333 generates each FEC block from the even-numbered cells from the cell transmitting section 332 and the received odd-numbered cells, and supplies the FEC block to the main-side decoding section 340.

It is noted that the sub-side cell exchange section 430 is configured similarly to the main-side cell exchange section 330.

Figure 20:
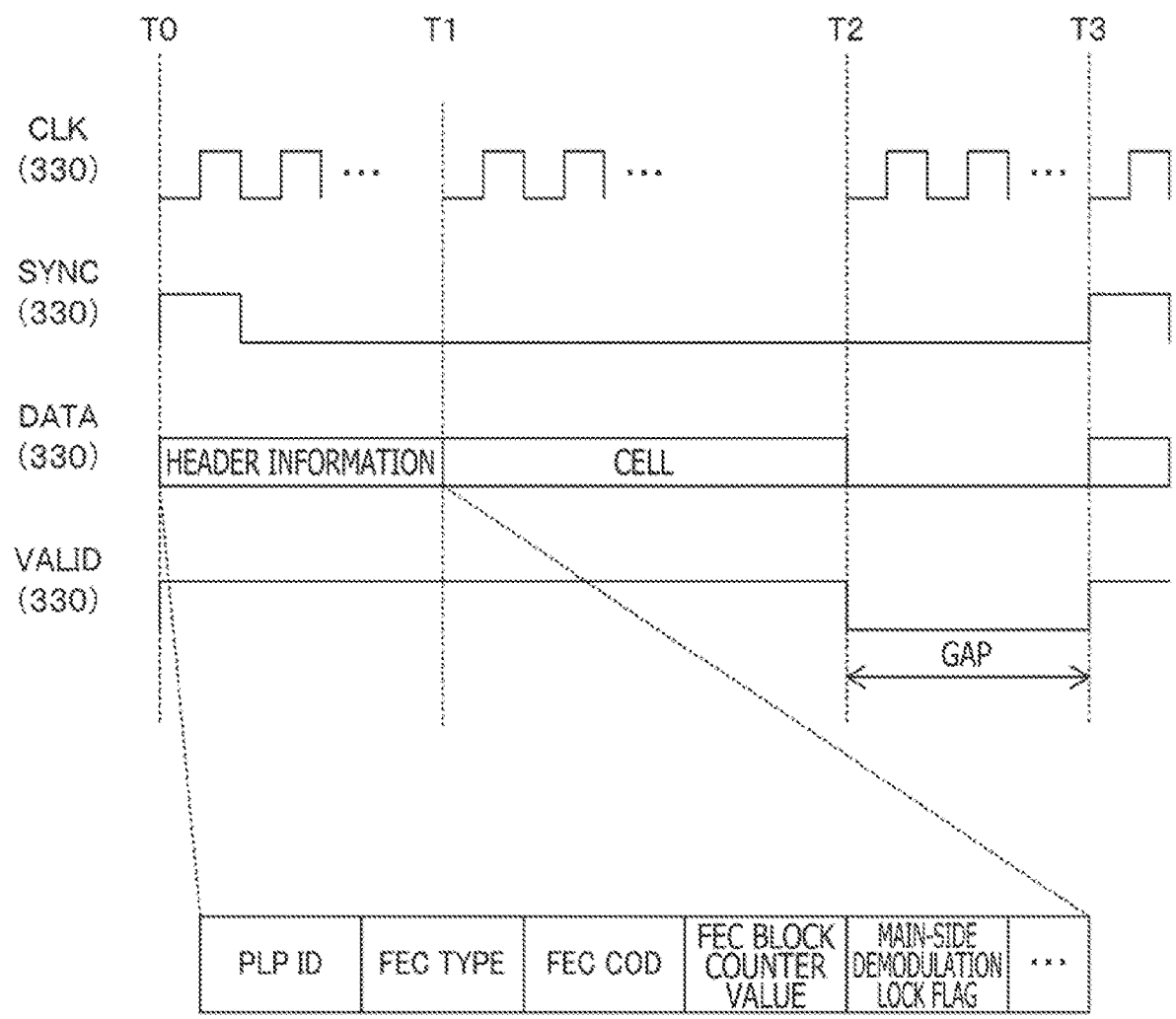
FIG. 20 is an example of a timing chart illustrating data transfer control according to the second embodiment of the present technology.

FIG. 20 is an example of a timing chart illustrating data transfer control according to the second embodiment of the present technology.

First, at the timing T0 of starting data transmission, the main-side cell exchange section 330 transmits the synchronizing signal SYNC for synchronization with the receiving side. Moreover, the main-side cell exchange section 330 transmits the header information in the period from the timing T0 to T1, and transmits the cells in the period from the timing T1 to T2 in synchronization with the clock signal CLK. At and after the timing T3, the main-side cell exchange section 330 transmits the next header information and next cells. The period from the timing T2 to T3 is the gap period in which valid data is not transmitted. The data valid signal VALID is set to the low level in this period, and set to the high level in the other periods.

The header information contains, for example, identification information regarding the PLPs, the encoding scheme and the code rate, the FEC block counter value, and the main-side demodulation lock flag. It is noted that the header information transmitted from the sub side contains the sub-side demodulation lock flag as well as the identification information regarding the PLPs and the like.

FIG. 21 is a diagram depicting an example of data transfer patterns according to the embodiment of the present technology. In the second embodiment, the clock signal CLK, the synchronizing signal SYNC, the data signal DATA, and the data valid signal VALID are transmitted bidirectionally between the sub side and the main side via the four signal lines, as exemplarily depicted in a pattern 1.

Moreover, as exemplarily depicted in a pattern 2, the clock signal CLK, the data signal DATA, and the data valid signal VALID can be transmitted bidirectionally between the sub side and the main side via the three signal lines. In this case, the synchronizing signal is transmitted via the data line as in the modification of the first embodiment.

Further, as exemplarily depicted in a pattern 3, the clock signal CLK and the data signal DATA can be transmitted bidirectionally between the sub side and the main side via the two signal lines. In this case, the data is transmitted continuously without the gap period. Further, as exemplarily depicted in a pattern 4, the clock signal CLK, the data signal DATA, and the synchronizing signal SYNC can be transmitted bidirectionally between the sub side and the main side via the three signal lines. In this case, the data is transmitted continuously without the gap period.

In addition, the main-side clock signal can be shared by the sub side. In this case, as exemplarily depicted in patterns 5 to 8, the sub side does not transmit the clock signal CLK. The patterns 5 to 8 are similar to the patterns 1 to 4 in configuration other than the configuration described above.

Moreover, the sub-side clock signal can be shared by the main side. In this case, as exemplarily depicted in patterns 9 to 12, the main side does not transmit the clock signal CLK. The patterns 9 to 12 are similar to the patterns 1 to 4 in configuration other than the configuration described above.

In this way, according to the second embodiment of the present technology, the receiving apparatus 200 exchanges the odd-numbered cells between the different frequency channels; thus, it is possible to improve the SNR, compared with the case of no cell exchange.

3. Third Embodiment

While the receiving apparatus 200 receives the data via the two frequency channels in the first embodiment described above, there is a concern of scarcity in frequency bands by use of only the two frequency channels in a case of transmitting a high-definition stream. The receiving apparatus 200 according to the third embodiment differs from that according to the first embodiment by receiving data via three frequency channels.

Figure 22:
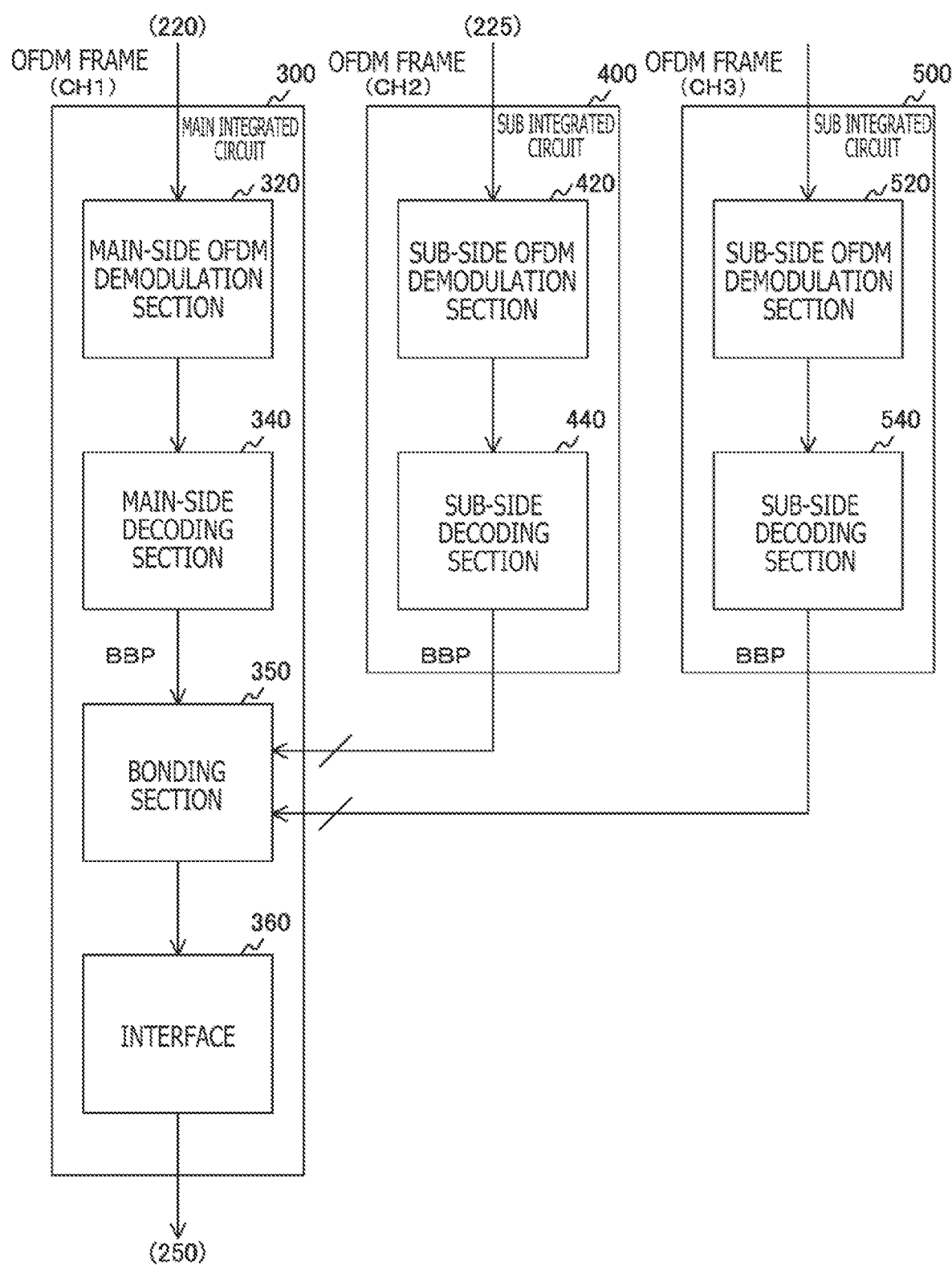
FIG. 22 is a block diagram depicting an example of configurations of a main integrated circuit and sub integrated circuits according to a third embodiment of the present technology.

FIG. 22 is a block diagram depicting an example of configurations of the main integrated circuit and sub integrated circuits according to the third embodiment of the present technology. The receiving apparatus 200 according to the third embodiment differs from that according to the first embodiment in that the receiving apparatus 200 further includes a sub integrated circuit 500.

The sub integrated circuit 500 demodulates and decodes an OFDM frame received via a frequency channel RF3 different from the frequency channels CH1 and CH2. The sub integrated circuit 500 includes a sub-side OFDM demodulation section 520 and a sub-side decoding section 540. The sub-side OFDM demodulation section 520 and the sub-side decoding section 540 are configured similarly to the sub-side OFDM demodulation section 420 and the sub-side decoding section 440.

The sub integrated circuit 500 acquires BBPs and supplies the BBPs to the bonding section 350. The bonding section 350 bonds the BBPs from the main-side decoding section 340 and the sub integrated circuits 400 and 500 together, and reconstructs a stream.

It is noted that the receiving apparatus 200 is capable of receiving data via four or more frequency channels by further adding a sub integrated circuit or sub integrated circuits.

In this way, according to the third embodiment of the present technology, the receiving apparatus 200 receives the data via the three frequency channels; thus, it is possible to expand the frequency bands, compared with a case in which the receiving apparatus 200 receives the data via the two frequency channels.

It is noted that the embodiments each illustrate an example for embodying the present technology and that a correspondence relation is held between each of the matters in the embodiments and each of invention specifying matters in the claims. Likewise, a correspondence relation is held between each of the invention specifying matters in the claims and each of matters in the embodiments of the present technology, the matters denoted by the same name as the invention specifying matters in the claims. However, the present technology is not limited to the embodiments and can be embodied by making various modifications of the embodiments without departing from the spirit of the technology.

Moreover, processing procedures described in the above embodiments may be regarded as a method involving these series of procedures or may be regarded as a program for causing a computer to execute these series of procedures or as a recording medium that stores the program. Examples of this recording medium include a CD (Compact Disc), an MD (MiniDisc), a DVD (Digital Versatile Disc), a memory card, a Blu-ray (registered trade mark) Disc, or the like.

Further, the advantages described in the present specification are given as an example only, and the advantages are not limited to those described in the present specification and may have other advantages.

It is noted that the present technology can also be configured as follows.

(1) A receiving apparatus including:
a first receiving circuit that receives a first frame obtained by encoding first packets within a stream containing the first packets and second packets via a first frequency channel;
a second receiving circuit that receives a second frame obtained by encoding the second packets via a second frequency channel different from the first frequency channel;
a first integrated circuit that decodes the first frame and that acquires the first packets; and
a second integrated circuit that performs processing for decoding the second frame and acquiring the second packets, and processing for bonding the first packets and the second packets together and reconstructing the stream.

(2) The receiving apparatus according to (1), in which the first integrated circuit includes a first demodulation section that demodulates the first frame and that acquires a plurality of first input cells, a first cell exchange section that exchanges part of the plurality of first input cells with cells of the second integrated circuit and that outputs the exchanged cells as first output cells, and a first decoding section that decodes the first output cells and that acquires the first packets, and the second integrated circuit includes a second demodulation section that demodulates the second frame and that acquires a plurality of second input cells, a second cell exchange section that exchanges part of the plurality of second input cells with the cells of the first integrated circuit and that outputs the exchanged cells as second output cells, a second decoding section that decodes the second output cells and that acquires the second packets, and a bonding section that bonds the first packets and the second packets together and that reconstructs the stream.

(3) The receiving apparatus according to (2), in which the first cell exchange section acquires a numerical value according to an input index of each of the first input cells and exchanges the first input cell in a case in which the input index is odd-numbered, and the second cell exchange section acquires an input index of each of the second input cells and exchanges the second input cell in a case in which the input index is odd-numbered.

(4) The receiving apparatus according to (3), in which the first cell exchange transmits at least one of a clock signal, a numerical value according to the input index, a synchronizing signal, or a data valid signal together with the first input cells to the second cell exchange.

(5) The receiving apparatus according to (3) or (4), in which the second cell exchange transmits at least one of a clock signal, a numerical value according to the input index, a synchronizing signal, or a data valid signal together with the second input cells to the first cell exchange.

(6) The receiving apparatus according to (1), in which the second integrated circuit bonds the first packets and the second packets together in a case in which predetermined conditions are satisfied.

(7) The receiving apparatus according to (6), in which the first frame contains a first coded block obtained by encoding the first packets, the second frame contains a second coded block obtained by encoding the second packets, the first integrated circuit determines whether or not an error is present in the first packets whenever the first coded block is decoded, and generates a first decoding lock flag in a case in which the number of times of continuous determination that the error is not present exceeds a predetermined number of times, and the second integrated circuit determines whether or not an error is present in the second packets whenever the first coded block is decoded, generates a second decoding lock flag in a case in which the number of times of continuous determination that the error is not present exceeds a predetermined number of times, and starts to bond the first packets and the second packets together upon generation of the first decoding lock flag and the second decoding lock flag.

(8) The receiving apparatus according to (8), in which the second integrated circuit bonds the first packets for which it is determined that the error is not present and the second packets for which it is determined that the error is not present, together.

(9) The receiving apparatus according to any one of (1) to (8), in which the first integrated circuit transmits at least one of a clock signal, a synchronizing signal, or a data valid signal together with the first packets to the second integrated circuit.

(10) The receiving apparatus according to any one of (1) to (9), in which the first and second frames are frames compliant with an ATSC (Advanced Television Systems Committee standards) 3.0 standard.

(11) A communication system including:

a transmitting apparatus that transmits a first frame obtained by encoding first packets within a stream containing the first packets and second packets via a first frequency channel and that transmits a second frame obtained by encoding the second packets via a second frequency channel different from the first frequency channel;

a first receiving circuit that receives the first frame via the first frequency channel;

a second receiving circuit that receives the second frame via the second frequency channel;

a first integrated circuit that decodes the first frame and that acquires the first packets; and a second integrated circuit that performs processing for decoding the second frame and acquiring the second packets and processing for bonding the first packets and the second packets together and reconstructing the stream.

(12) A receiving apparatus control method including:

a first receiving procedure of receiving a first frame obtained by encoding first packets within a stream containing the first packets and second packets via a first frequency channel;

a second receiving procedure of receiving a second frame obtained by encoding the second packets via a second frequency channel different from the first frequency channel;

a first acquiring procedure of, by a first integrated circuit, decoding the first frame and acquiring the first packets; and a second acquiring procedure of, by a second integrated circuit, performing processing for decoding the second frame and acquiring the second packets and processing for bonding the first packets and the second packets together and reconstructing the stream.

REFERENCE SIGNS LIST

100: Transmitting apparatus
110: Input formatting block
120: Stream partitioning block
130, 135: BICM block
140: Cell exchange block
150, 155: Framing and interleaving block
160, 165: Waveform generation section
170: RF transmitting circuit
180: Antenna
200: Receiving apparatus
210, 215: Antenna
220, 225: RF receiving circuit
250: Decoded data processing section
300: Main integrated circuit
320: Main-side OFDM demodulation section
330: Main-side cell exchange section
331: FEC block counter 332: Cell transmitting section
333: Cell receiving section
340: Main-side decoding section
350, 450: Bonding section
360, 460: Interface
400, 500: Sub integrated circuit
420, 520: Sub-side OFDM demodulation section
430: Sub-side cell exchange section
440, 540: Sub-side decoding section
441: FEC decoding section
442: Sub-side transmitting section

The invention claimed is:

1. A receiving apparatus, comprising:
a first receiving circuit configured to receive a first frame via a first frequency channel, wherein
the first frame includes first coded blocks obtained by encoding of first packets within a stream, and
the stream includes the first packets and second packets;
a second receiving circuit configured to receive a second frame via a second frequency channel different from the first frequency channel, wherein the second frame includes second coded blocks obtained by encoding of the second packets;
a first integrated circuit configured to:
decode the first coded blocks of the first frame to acquire the first packets;
determine one of a presence or an absence of an error in the acquired first packets based on the decode of the first coded blocks of the first frame; and
generate a first decoding lock flag based on a number of times of the determination of the absence of the error in the acquired first packets exceeds a threshold number of times; and
a second integrated circuit configured to:
decode the second coded blocks of the second frame to acquire the second packets;
determine one of a presence or an absence of an error in the acquired second packets based on the decode of the second coded blocks of the second frame;
generate a second decoding lock flag based on a number of times of the determination of the absence of the error in the acquired second packets exceeds the threshold number of times; and
bond the first packets and the second packets to reconstruct the stream, based on the generation of the first decoding lock flag and the second decoding lock flag.

2. The receiving apparatus according to claim 1, wherein the first integrated circuit includes:
a first demodulation section configured to demodulate the first frame to acquire a plurality of first input cells;
a first cell exchange section configured to:
exchange a part of the plurality of first input cells with a part of a plurality of second input cells of the second integrated circuit; and
output the exchanged part of the plurality of second input cells as first output cells in units of the first coded blocks; and
a first decoding section configured to decode the first output cells to acquire the first packets, and
the second integrated circuit includes:
a second demodulation section configured to demodulate the second frame to acquire the plurality of second input cells;
a second cell exchange section configured to:
exchange the part of the plurality of second input cells with the part of the plurality of first input cells of the first integrated circuit; and
output the exchanged part of the plurality of first input cells as second output cells in units of the second coded blocks;
a second decoding section configured to decode the second output cells to acquire the second packets; and
a bonding section configured to bond the first packets and the second packets to reconstruct the stream, based on the decode of each of the first output cells and the second output cells.

3. The receiving apparatus according to claim 2, wherein the first cell exchange section is further configured to:
acquire an input index of each of the plurality of first input cells; and
exchange the part of the plurality of first input cells based on the input index of each of the part of the plurality of first input cells is odd-numbered, and
the second cell exchange section is further configured to:
acquire an input index of each of the plurality of second input cells; and
exchange the part of the plurality of second input cells based on the input index of each of the part of the plurality of second input cells is odd-numbered.

4. The receiving apparatus according to claim 3, wherein the first cell exchange section is further configured to transmit at least one of a clock signal, a numerical value according to the input index of each of the part of the plurality of first input cells, a synchronizing signal, or a data valid signal together with the part of the plurality of first input cells to the second cell exchange section.

5. The receiving apparatus according to claim 3, wherein the second cell exchange section is further configured to transmit at least one of a clock signal, a numerical value according to the input index of each of the part of the plurality of second input cells, a synchronizing signal, or a data valid signal together with the part of the plurality of second input cells to the first cell exchange section.

6. The receiving apparatus according to claim 1, wherein the second integrated circuit is further configured to bond the first packets and the second packets based on the determination of the absence of the error in each of the first packets and the second packets.

7. The receiving apparatus according to claim 1, wherein the first integrated circuit is further configured to transmit at least one of a clock signal, a synchronizing signal, or a data valid signal together with the first packets to the second integrated circuit.

8. The receiving apparatus according to claim 1, wherein the first frame and the second frame are compliant with an ATSC (Advanced Television Systems Committee standards) 3.0 standard.

9. A communication system, comprising:
a transmitting apparatus configured to:
encode first coded blocks of first packets within a stream, wherein the stream includes the first packets and second packets;
transmit a first frame including the encoded first coded blocks of the first packets via a first frequency channel;
encode second coded blocks of the second packets; and
transmit a second frame including the encoded second coded blocks of the second packets via a second frequency channel different from the first frequency channel;

a first receiving circuit configured to receive the first frame via the first frequency channel;

a second receiving circuit configured to receive the second frame via the second frequency channel;

a first integrated circuit configured to:
- decode the first coded blocks of the first frame to acquire the first packets;
- determine one of a presence or an absence of an error in the acquired first packets based on the decode of the first coded blocks of the first frame; and
- generate a first decoding lock flag based on a number of times of the determination of the absence of the error in the acquired first packets exceeds a threshold number of times; and a second integrated circuit configured to:
- decode the second coded blocks of the second frame to acquire the second packets;
- determine one of a presence or an absence of an error in the acquired second packets based on the decode of the second coded blocks of the second frame;
- generate a second decoding lock flag based on a number of times of the determination of the absence of the error in the acquired second packets exceeds the threshold number of times; and
- bond the first packets and the second packets to reconstruct the stream, based on the generation of the first decoding lock flag and the second decoding lock flag.

10. A receiving apparatus control method, comprising:

receiving a first frame via a first frequency channel, wherein
- the first frame includes first coded blocks obtained by encoding of first packets within a stream, and
- the stream includes the first packets and second packets;

receiving a second frame via a second frequency channel different from the first frequency channel, wherein the second frame includes second coded blocks obtained by encoding of the second packets;

decoding the first coded blocks of the first frame to acquire the first packets;

determining one of a presence or an absence of an error in the acquired first packets based on the decode of the first coded blocks of the first frame;

generating a first decoding lock flag based on a number of times of the determination of the absence of the error in the acquired first packets exceeds a threshold number of times;

decoding the second coded blocks of the second frame to acquire the second packets;

determining one of a presence or an absence of an error in the acquired second packets based on the decode of the second coded blocks of the second frame;

generating a second decoding lock flag based on a number of times of the determination of the absence of the error in the acquired second packets exceeds the threshold number of times; and bonding the first packets and the second packets to reconstruct the stream, based on the generation of the first decoding lock flag and the second decoding lock flag.

\* \* \* \* \*